US011111029B2

(12) United States Patent
Hoisington

(10) Patent No.: US 11,111,029 B2
(45) Date of Patent: Sep. 7, 2021

(54) SYSTEM AND METHOD FOR OPERATING A BOUNDARY LAYER INGESTION FAN

(71) Applicant: THE BOEING COMPANY, Chicago, IL (US)

(72) Inventor: Zachary Charles Hoisington, Seal Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 689 days.

(21) Appl. No.: 15/663,380

(22) Filed: Jul. 28, 2017

(65) Prior Publication Data

US 2019/0031363 A1    Jan. 31, 2019

(51) Int. Cl.

| B64D 35/02 | (2006.01) |
|---|---|
| B64D 27/14 | (2006.01) |
| B64D 27/20 | (2006.01) |
| B64C 21/06 | (2006.01) |
| B64D 35/04 | (2006.01) |
| B64D 35/00 | (2006.01) |

(52) U.S. Cl.
CPC ............ *B64D 35/02* (2013.01); *B64C 21/06* (2013.01); *B64D 27/14* (2013.01); *B64D 27/20* (2013.01); *B64D 35/00* (2013.01); *B64D 35/04* (2013.01)

(58) Field of Classification Search
CPC ........ B64D 27/14; B64D 27/20; B64D 27/10; B64D 35/02; B64D 35/08; B64D 35/04; B64C 21/06; F02C 6/206; Y02T 50/671
See application file for complete search history.

(56) References Cited

U.S. PATENT DOCUMENTS

| 2,472,763 | A | * | 6/1949 | Rodeck | B64C 39/00 244/13 |
|---|---|---|---|---|---|
| 2,604,276 | A | * | 7/1952 | Huben | F02C 6/20 244/15 |
| 2,964,264 | A | * | 12/1960 | Multhopp | B64C 23/005 244/12.4 |
| 2,988,301 | A | * | 6/1961 | Fletcher | B64C 29/0025 244/12.3 |
| 3,018,987 | A | * | 1/1962 | Multhopp | B64C 23/005 244/52 |
| 3,054,577 | A | * | 9/1962 | Wolf | F02K 3/062 60/226.1 |
| 3,073,547 | A | * | 1/1963 | Fischer | B64C 29/0033 244/7 C |
| 3,081,964 | A | * | 3/1963 | Quenzler | B64C 29/0033 244/7 R |
| 3,109,614 | A | * | 11/1963 | Steidl | B64D 27/20 244/87 |

(Continued)

OTHER PUBLICATIONS

"Concept study "Propulsive Fuselage": Adding an extra engine to reduce emissions", Bauhaus Luftfahrt e.V., accessed May 15, 2017, 2 pages. <http://www.bauhausluftfahrt.net/research/systemundflugzeugtechnologien/propulsivefuselage>.

(Continued)

*Primary Examiner* — Medhat Badawi
(74) *Attorney, Agent, or Firm* — Moore IP Law

(57) ABSTRACT

An aircraft includes a fuselage having a tail section and an engine core coupled via an external pylon to the fuselage. The aircraft further includes a boundary layer ingestion (BLI) fan coupled to the tail section of the fuselage and coupled via a shaft to the engine core.

21 Claims, 12 Drawing Sheets

(56) References Cited

U.S. PATENT DOCUMENTS

| | | | | |
|---|---|---|---|---|
| 3,136,499 A * | 6/1964 | Kessler | B64C 29/0033 | 244/7 C |
| 3,181,810 A * | 5/1965 | Olson | B64C 29/0033 | 244/7 R |
| 3,194,516 A * | 7/1965 | Messerschmitt | B64D 27/20 | 244/74 |
| 3,415,468 A * | 12/1968 | Labombarde | B64C 11/00 | 244/13 |
| 3,417,946 A * | 12/1968 | Hartley | B64C 5/02 | 244/87 |
| 3,576,300 A * | 4/1971 | Palfreyman | B64D 27/20 | 244/36 |
| 3,592,415 A * | 7/1971 | Walley | B64C 1/00 | 244/55 |
| 3,643,439 A * | 2/1972 | Petersen | F02K 3/12 | 60/225 |
| 3,820,746 A * | 6/1974 | Vedova | B64C 29/0016 | 244/55 |
| 3,972,490 A * | 8/1976 | Zimmermann | B64C 29/0016 | 244/12.3 |
| 3,995,794 A * | 12/1976 | Lanier | B64C 15/02 | 244/12.4 |
| 4,030,688 A * | 6/1977 | Pellarini | B64C 39/00 | 244/13 |
| 4,050,651 A * | 9/1977 | Neal | B64C 3/14 | 244/15 |
| 4,149,688 A * | 4/1979 | Miller, Jr. | B64C 29/0033 | 244/12.4 |
| D264,838 S * | 6/1982 | Dornier | D12/324 | |
| 4,387,866 A * | 6/1983 | Eickmann | H01F 41/08 | 244/123.9 |
| 4,447,022 A * | 5/1984 | Lion | B64C 5/02 | 244/1 N |
| 4,456,204 A * | 6/1984 | Hapke | B64D 27/20 | 244/53 R |
| 4,492,353 A * | 1/1985 | Phillips | B64C 29/0075 | 244/12.4 |
| 4,500,055 A * | 2/1985 | Krojer | B64D 27/14 | 244/55 |
| 4,605,185 A * | 8/1986 | Reyes | B64D 27/24 | 244/55 |
| 4,917,332 A * | 4/1990 | Patterson, Jr. | B64C 23/065 | 244/58 |
| 4,925,131 A * | 5/1990 | Eickmann | B64C 11/28 | 244/123.9 |
| D308,663 S * | 6/1990 | Carlson | D12/337 | |
| 4,953,812 A * | 9/1990 | Van der Hoeven | B64D 27/14 | 244/119 |
| 4,966,338 A * | 10/1990 | Gordon | B64C 23/06 | 244/130 |
| 4,976,396 A * | 12/1990 | Carlson | B64C 1/16 | 244/119 |
| 4,982,914 A * | 1/1991 | Eickmann | B64C 11/28 | 244/54 |
| 5,096,142 A * | 3/1992 | Rodriguez | B64C 7/00 | 244/130 |
| 5,115,996 A * | 5/1992 | Moller | B64C 29/0025 | 239/265.19 |
| 5,443,229 A * | 8/1995 | O'Brien | B64D 27/20 | 244/54 |
| D389,111 S * | 1/1998 | Flattery | D12/190 | |
| 5,779,191 A * | 7/1998 | Brislawn | B64C 5/02 | 244/194 |
| 5,957,405 A * | 9/1999 | Williams | B64C 1/00 | 244/15 |
| 6,134,876 A * | 10/2000 | Hines | F02C 3/10 | 60/39.41 |
| 6,394,389 B1 * | 5/2002 | Saiz | B64C 7/02 | 244/91 |
| 6,575,406 B2 * | 6/2003 | Nelson | B64C 1/0009 | 244/119 |
| 6,612,522 B1 * | 9/2003 | Aldrin | B64G 1/002 | 244/159.3 |
| 6,688,552 B2 * | 2/2004 | Franchet | F02C 7/36 | 244/12.3 |
| 6,824,092 B1 * | 11/2004 | Franklin, III | B64C 30/00 | 244/1 N |
| 6,834,495 B2 * | 12/2004 | Saito | F02C 3/10 | 60/224 |
| 6,848,650 B2 * | 2/2005 | Hoisington | B60V 1/08 | 244/13 |
| 6,921,045 B2 * | 7/2005 | Chang | B64C 3/16 | 244/15 |
| 7,107,756 B2 * | 9/2006 | Rolt | F02K 3/06 | 60/224 |
| 7,900,865 B2 * | 3/2011 | Moore | B64C 39/12 | 244/1 N |
| 7,900,868 B2 * | 3/2011 | Sankrithi | B64C 3/10 | 244/1 N |
| 7,905,449 B2 * | 3/2011 | Cazals | B64C 5/06 | 244/53 R |
| 7,926,760 B2 * | 4/2011 | Gall | B64C 3/10 | 244/1 N |
| 7,967,243 B2 * | 6/2011 | Verde Preckler | B64C 15/12 | 244/56 |
| 8,011,613 B2 * | 9/2011 | Belleville | B64D 27/14 | 244/1 N |
| 8,015,796 B2 * | 9/2011 | Babu | F01D 13/003 | 60/226.1 |
| 8,074,924 B2 * | 12/2011 | Cros | B64C 5/06 | 244/13 |
| 8,167,239 B2 * | 5/2012 | Guering | B64D 27/02 | 244/54 |
| 8,256,709 B2 * | 9/2012 | Negulescu | B64D 27/08 | 244/54 |
| 8,313,055 B2 * | 11/2012 | Gall | B64D 27/02 | 244/1 N |
| 8,322,655 B1 * | 12/2012 | Kismarton | B64C 5/02 | 244/119 |
| 8,393,567 B2 * | 3/2013 | Moore | B64D 27/14 | 244/55 |
| 8,544,787 B2 * | 10/2013 | Lee | B64C 29/0033 | 244/12.4 |
| 8,573,531 B2 * | 11/2013 | Cazals | B64D 27/20 | 244/54 |
| 8,579,230 B2 * | 11/2013 | Diochon | B64D 29/04 | 244/54 |
| 8,628,040 B2 * | 1/2014 | Moore | B64C 5/08 | 244/1 N |
| 8,632,032 B2 * | 1/2014 | Butler | B64D 29/04 | 244/54 |
| 8,651,414 B2 * | 2/2014 | Cazals | B64C 1/068 | 244/13 |
| 8,684,302 B2 * | 4/2014 | Chanez | B64C 1/0009 | 244/53 B |
| 8,708,274 B2 * | 4/2014 | Lord | B64D 27/14 | 244/55 |
| 8,720,815 B2 * | 5/2014 | Vetters | B64D 27/10 | 244/54 |
| 9,266,605 B2 * | 2/2016 | Richter | B64D 45/0005 | |
| 9,346,551 B2 * | 5/2016 | Stretton | B64D 27/14 | |
| 9,475,579 B2 * | 10/2016 | Fredericks | B64C 25/52 | |
| 9,540,113 B2 * | 1/2017 | Gukeisen | B64D 27/14 | |
| 9,567,062 B2 * | 2/2017 | Chandler | B64C 5/06 | |
| 9,573,693 B2 * | 2/2017 | Cazals | B64D 27/14 | |
| 9,701,395 B2 * | 7/2017 | Veilleux, Jr. | B64C 11/48 | |
| 9,764,848 B1 * | 9/2017 | Vondrell | F01D 15/10 | |
| 9,834,305 B2 * | 12/2017 | Taylor | B64C 29/00 | |
| 9,845,159 B2 * | 12/2017 | Suciu | B64D 27/20 | |
| 9,884,674 B2 * | 2/2018 | Suciu | B64C 5/02 | |
| 9,914,528 B2 * | 3/2018 | Hirano | B64C 11/46 | |
| 9,957,042 B1 * | 5/2018 | Vander Lind | B64C 29/0033 | |
| 9,975,631 B1 * | 5/2018 | McLaren | B64C 29/0033 | |
| 10,071,801 B2 * | 9/2018 | North | B64C 25/52 | |
| 10,106,265 B2 * | 10/2018 | Yao | B64D 27/18 | |
| 10,107,500 B2 * | 10/2018 | O'Flarity | F02K 3/077 | |
| 10,112,696 B2 * | 10/2018 | Chandler | B64D 25/00 | |
| 10,267,263 B2 * | 4/2019 | Lord | B64D 27/14 | |

(56) References Cited

U.S. PATENT DOCUMENTS

| | | | | |
|---|---|---|---|---|
| 10,287,024 B2* | 5/2019 | Suciu | | B64D 27/14 |
| 10,287,991 B2* | 5/2019 | Suciu | | F02C 7/36 |
| 10,352,274 B2* | 7/2019 | Suciu | | B64C 11/46 |
| 10,435,163 B2* | 10/2019 | Gallet | | F02C 6/02 |
| 10,450,079 B2* | 10/2019 | Beutin | | B64C 3/32 |
| 2001/0011691 A1* | 8/2001 | Provost | | B64C 11/001 |
| | | | | 244/55 |
| 2002/0189230 A1* | 12/2002 | Franchet | | F02K 3/025 |
| | | | | 60/204 |
| 2004/0025493 A1* | 2/2004 | Wojciechowski | | F02K 3/06 |
| | | | | 60/224 |
| 2006/0011780 A1* | 1/2006 | Brand | | B64D 27/14 |
| | | | | 244/60 |
| 2007/0102575 A1* | 5/2007 | Morgan | | B64C 9/12 |
| | | | | 244/87 |
| 2007/0176047 A1* | 8/2007 | Moore | | B64C 5/08 |
| | | | | 244/54 |
| 2008/0048065 A1* | 2/2008 | Kuntz | | A63H 17/00 |
| | | | | 244/17.23 |
| 2008/0098719 A1* | 5/2008 | Addis | | B64D 27/10 |
| | | | | 60/226.1 |
| 2008/0099632 A1* | 5/2008 | Addis | | B64D 27/14 |
| | | | | 244/53 B |
| 2008/0245925 A1* | 10/2008 | Udall | | B64C 5/02 |
| | | | | 244/52 |
| 2009/0065632 A1* | 3/2009 | Cazals | | B64C 5/02 |
| | | | | 244/15 |
| 2009/0229243 A1* | 9/2009 | Guemmer | | B64D 27/12 |
| | | | | 60/226.1 |
| 2010/0212288 A1* | 8/2010 | Suchezky | | B64C 15/12 |
| | | | | 60/228 |
| 2011/0150645 A1* | 6/2011 | Moore | | B64C 11/003 |
| | | | | 416/1 |
| 2011/0315809 A1* | 12/2011 | Oliver | | B64C 29/0033 |
| | | | | 244/12.4 |
| 2012/0128487 A1* | 5/2012 | Eames | | B64C 11/346 |
| | | | | 416/1 |
| 2014/0021292 A1* | 1/2014 | West | | F02C 7/20 |
| | | | | 244/54 |
| 2014/0117152 A1* | 5/2014 | Suciu | | F02K 3/06 |
| | | | | 244/54 |
| 2014/0130512 A1* | 5/2014 | Chouard | | B64D 27/14 |
| | | | | 60/797 |
| 2014/0183296 A1* | 7/2014 | Suciu | | F02K 3/06 |
| | | | | 244/54 |
| 2014/0260182 A1* | 9/2014 | Suciu | | F02C 3/10 |
| | | | | 60/224 |
| 2015/0013307 A1* | 1/2015 | Burghardt | | F02C 3/10 |
| | | | | 60/226.1 |
| 2015/0144742 A1* | 5/2015 | Moxon | | B64C 3/00 |
| | | | | 244/215 |
| 2015/0226117 A1* | 8/2015 | Suciu | | F02C 3/06 |
| | | | | 60/726 |
| 2015/0284067 A1* | 10/2015 | Suciu | | B64C 5/02 |
| | | | | 244/87 |
| 2015/0292411 A1* | 10/2015 | Suciu | | F02C 7/20 |
| | | | | 60/805 |
| 2015/0298794 A1* | 10/2015 | Suciu | | F02K 1/62 |
| | | | | 244/45 R |
| 2015/0298814 A1* | 10/2015 | Suciu | | F02K 1/62 |
| | | | | 244/11 OB |
| 2016/0010589 A1* | 1/2016 | Rolt | | F01D 13/003 |
| | | | | 60/226.1 |
| 2016/0017844 A1* | 1/2016 | Suciu | | F02K 1/60 |
| | | | | 244/53 B |
| 2016/0076447 A1* | 3/2016 | Merlo | | F01D 25/285 |
| | | | | 60/39.12 |
| 2016/0144966 A1* | 5/2016 | Trahmer | | B64C 9/16 |
| | | | | 244/13 |
| 2016/0152318 A1* | 6/2016 | Alexander | | B64D 37/34 |
| | | | | 244/13 |
| 2016/0229532 A1* | 8/2016 | Shapery | | B64C 29/0075 |
| 2016/0368590 A1* | 12/2016 | Karem | | B64C 11/28 |
| 2017/0081035 A1* | 3/2017 | Becker | | B64D 27/20 |
| 2017/0101191 A1* | 4/2017 | Becker | | B64D 27/18 |
| 2017/0121031 A1* | 5/2017 | Stieger | | B64C 21/06 |
| 2017/0137134 A1* | 5/2017 | Vessot | | B64D 35/04 |
| 2017/0137135 A1* | 5/2017 | Chanez | | F02K 3/06 |
| 2017/0167437 A1* | 6/2017 | Cazals | | B64D 27/20 |
| 2017/0233060 A1* | 8/2017 | Glover | | B64C 5/02 |
| | | | | 244/54 |
| 2017/0291693 A1* | 10/2017 | Niergarth | | B64C 21/06 |
| 2017/0297728 A1* | 10/2017 | Niergarth | | B64D 27/02 |
| 2017/0313430 A1* | 11/2017 | Pautis | | B64D 27/12 |
| 2017/0361939 A1* | 12/2017 | Negulescu | | B64C 1/16 |
| 2018/0037331 A1* | 2/2018 | Suciu | | B64D 27/14 |
| 2018/0156109 A1* | 6/2018 | Suciu | | F02C 6/08 |
| 2018/0170560 A1* | 6/2018 | Conti | | B64D 27/14 |
| 2018/0327104 A1* | 11/2018 | Abele | | B64D 27/10 |
| 2018/0370641 A1* | 12/2018 | Dindar | | B64D 27/10 |
| 2019/0031363 A1* | 1/2019 | Hoisington | | B64D 27/14 |

OTHER PUBLICATIONS

Onera, "NOVA—NextGen ONERA Versatile Aircraft", Jun. 15, 2015, accessed May 15, 2017, 2 pages. <http://www.onera.fr/en/imagedumois/novanextgenoneraversatileaircraft>.

Rolt, et al., "Distributed Propulsion Systems to Maximize the Benefits of Boundary Layer Ingestion", University of Cincinnati, 2015, 10 pages.

Aurora Fllight Services, A Boeing Company, https://www.aurora.aero/programs/, retrieved Sep. 14, 2020, pp. 1-3.

Welstead, Dr. Jason R., et al., "Conceptual Design of a Single-Aisle Turboelectric Commercial Transport with Fuselage Boundary Layer Ingestion," www.nianet.org/ODM/ODM%20Tuesday%20presentations%20Final/19%20Patterson%20starcabl_scitech2016_shortened_distribution_ODM.pdf, retrieved Sep. 14, 2020, pp. 1-34.

Wittry, Jan, "NASA Runs First-Ever Test of New Jet Engine Tech," https://www.nasa.gov/feature/nasa-runs-first-ever-test-of-new-jet-engine-tech, Dec. 7, 2016, pp. 1-4.

* cited by examiner

US 11,111,029 B2

SYSTEM AND METHOD FOR OPERATING A BOUNDARY LAYER INGESTION FAN

FIELD OF THE DISCLOSURE

The present disclosure is generally related to use of a boundary layer ingestion fan.

BACKGROUND

Boundary Layer Ingestion ("BLI") propulsion typically involves placing an intake of a propulsion system close to a skin (e.g., one or more external surfaces) of a fuselage of an aircraft, such that lower velocity airflow (e.g., boundary layer airflow) close to the skin of the fuselage can be ingested by the intake. The lower velocity (and thus lower momentum) of the boundary layer airflow causes the propulsion system to exhibit increased engine performance, such as a reduction in noise and emissions and an increase in engine efficiency, when accelerating (referred to as "reenergizing") the boundary layer airflow. While BLI propulsion systems have potential for fuel-burn reduction as compared to conventional aircraft propulsion systems which intake free stream airflow, issues related to BLI propulsion systems (e.g., higher weight, increased complexity, and aircraft balance issues) have prevented BLI propulsion systems from being implemented on commercial aircraft.

SUMMARY

In a particular implementation, an aircraft includes a fuselage having a tail section and an engine core coupled via an external pylon to the fuselage. The aircraft further includes a boundary layer ingestion (BLI) fan coupled to the tail section of the fuselage and coupled via a shaft to the engine core.

In another particular implementation, an aircraft includes a fuselage having a tail section and wings coupled to the fuselage. The aircraft further includes an engine core coupled to one of the wings and a BLI fan coupled to the tail section of the fuselage and coupled via a mechanical driveshaft system or a hydraulic drive system to the engine core.

In another particular implementation, an aircraft includes a fuselage having a tail section and a tail coupled to the tail section of the fuselage. The aircraft further includes an engine core coupled to the tail and a BLI fan coupled to the tail section of the fuselage and coupled to the engine core.

In another particular implementation, a method includes generating power by an engine core coupled externally to a fuselage. The method further includes applying the power to a mechanical driveshaft system or a hydraulic drive system to drive a BLI fan to generate thrust. The BLI fan is coupled to a tail section of the fuselage and aft of the engine core.

In another particular implementation, a method includes receiving first power from a first engine core coupled externally to a fuselage. The method also includes receiving second power from a second engine core coupled externally to the fuselage, power. The method further includes driving a BLI fan coupled to a tail section of the fuselage based on the first power and the second power.

Because the first engine core is positioned away from the BLI fan and externally coupled to the fuselage, the first engine core is able to be at a more advantageous location for airplane balance and safety in the event of a core failure while receiving undisturbed free stream flow, as compared to an engine core that is collocated with a BLI fan. The features, functions, and advantages described can be achieved independently in various embodiments or may be combined in yet other embodiments, further details of which can be found with reference to the following description and drawings.

DETAILED DESCRIPTION

Implementations described herein are directed to a system and method for operating a Boundary Layer Ingestion (BLI) fan. An aircraft including a BLI propulsion system has increased fuel efficiency and reduced drag as compared to aircraft with conventional propulsion systems. In some implementations, the BLI fan is coupled to a rear portion (e.g., a tail section) of a fuselage of the aircraft. The BLI fan is operationally coupled by a BLI fan drive system to one or more engine cores (e.g., gas turbine engines) of the aircraft. At least one engine core of the one or more engine cores is coupled externally to the fuselage of the aircraft, such as via an external pylon, via a wing, or via a tail (e.g., a vertical stabilizer).

During operation, the BLI fan ingests boundary layer airflow of the fuselage of the aircraft and accelerates the boundary layer airflow based on power received from one or more of the engine cores. To illustrate, the BLI fan drive system receives power (shaft power) from at least one engine core and transmits the power to the BLI fan. The power drives the BLI fan to increase velocity of the boundary layer airflow, which produces thrust. In some implementations, the BLI fan drive system includes or corresponds to a mechanical driveshaft system and the BLI fan drive system transfers or transmits power generated by the one or more engine cores to the BLI fan via a plurality of shafts and gears. In other implementations, the BLI fan drive system includes or corresponds to a hydraulic drive system and transfers or transmits power generated by the one or more engine cores via a hydraulic pump and motor.

By powering an aircraft with a BLI fan (e.g., a fan that ingests boundary layer airflow) fuel efficiency is increased as compared to a conventional turbofan engine that ingests free stream airflow. Accordingly, an aircraft powered by a BLI fan produces lower carbon emissions and has reduced fuel costs as compared to an aircraft powered by conventional engines.

Figure 1:
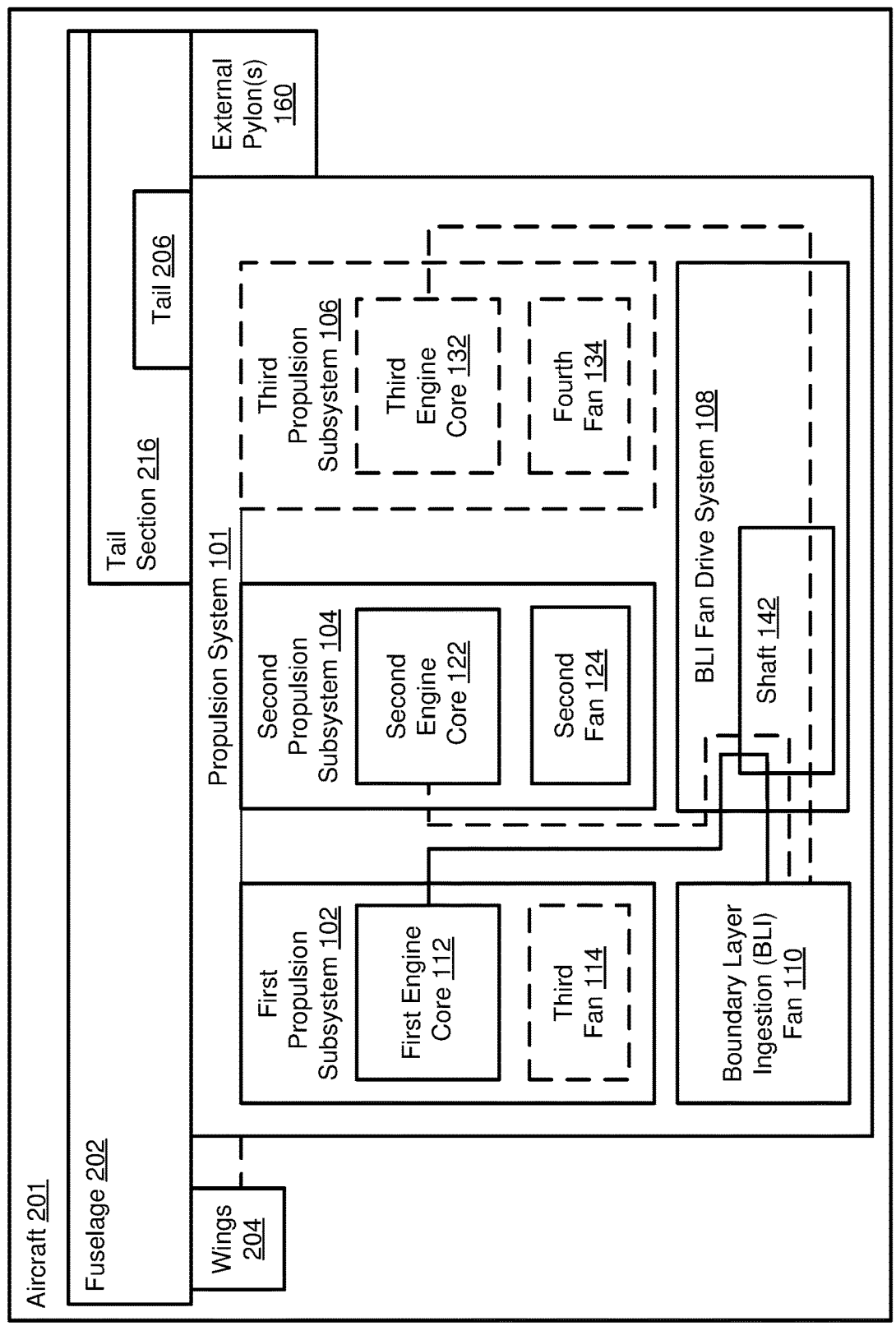
FIG. 1 is a block diagram that illustrates an example of a propulsion system including a BLI fan.

FIG. 1 illustrates an example of a block diagram of a system 100 that includes a propulsion system 101 for operating a BLI fan 110. The propulsion system 101 enables an aircraft 201 to power the BLI fan 110 with one or more engine cores and distributed propulsion (e.g., the BLI fan 110 is not collocated with an engine core of the one or more engine cores). The one or more engine cores that provide power to the BLI fan 110 are coupled externally to a fuselage 202 (e.g., via an external pylon 160) and are remote from the BLI fan 110 (e.g., not collocated with the BLI fan 110). The BLI fan 110 does not receive power from an engine core located in or near the fuselage 202 or a tail section 216. By positioning the one or more engine cores separate from the BLI fan 110 and externally to the fuselage 202, the one or more engine cores receive or ingest free stream air as compared to boundary layer airflow. Accordingly, the one or more engines produce more thrust and have increased fuel efficiency as compared to BLI propulsions systems where both an engine core and a fan receive boundary layer airflow. Furthermore, by positioning the one or more engine cores further from the fuselage 202, the tail section 216, or both, the safety of the aircraft 201 may be increased (e.g., less collateral damage from a "rotor burst" event). Additionally, the BLI fan 110 may be positioned aft of the tail section 216, such as behind a vertical stabilizer of the aircraft 201. By positioning the BLI fan 110 aft of the tail section 216, more boundary layer airflow may be captured by the BLI fan 110, increasing the fuel efficiency of the aircraft 201. In addition, aircraft configurations that position the BLI fan 110 aft of the tail section 216 may be less complex and easier to manufacture than other proposed conceptual BLI powered aircraft configurations. Additionally, by placing the BLI fan 110 aft of the tail section 216, loads generated by a tail 206 are transferred to the fuselage 202 independent of the BLI fan 110 (e.g., the BLI fan 110 does not support the tail loads), which reduces maintenance costs.

The BLI fan 110 is included in-a the propulsion system 101 and includes two or three engine cores and two, three, or four fans (including the BLI fan 110). By powering the BLI fan 110 using a two engine core configuration, the benefits (e.g., fuel efficiency, reduced maintenance costs, etc.) of a two engine aircraft are maintained. By removing the engine core from the tail section 216 of the aircraft 201 and coupling the engine core externally to the fuselage 202, aircraft balance and safety are improved over designs that place an engine core near other engine cores, place an engine core in the fuselage 202 the tail section 216, or both.

One or more of the engine cores that power the BLI fan 110 ingest free stream airflow while the BLI fan 110 ingests boundary layer airflow, which further increases efficiency of the propulsion system 101. To illustrate, boundary layer airflow is generated as the aircraft 201 moves through the air (referred to as free stream airflow), and as the aircraft 201 moves through the free stream airflow a portion of the free stream airflow near a skin or an exterior of the aircraft 201 is slowed down and forms the boundary layer airflow from interaction with the aircraft. The BLI fan 110 captures the slower boundary layer airflow and increases a velocity of the boundary layer airflow. Because the BLI fan 110 accelerates slower moving airflow a change in velocity from intake airflow velocity to exhaust airflow velocity is higher than for an engine which receives and accelerates the faster free stream airflow. The higher change in velocity of the BLI fan 110 produces increased thrust. Accordingly, the BLI fan 110 reduces total aircraft power required and fuel burn.

To enable efficient operation of the BLI fan 110, the propulsion system 101 includes a first propulsion subsystem 102, a second propulsion subsystem 104, a BLI fan drive system 108, and the BLI fan 110. In some implementations, the propulsion system 101 may further include a third propulsion subsystem 106. The propulsion system 101 may include or correspond to a two-engine, two-fan propulsion system, a two-engine, three-fan propulsion system, a three-engine, three-fan propulsion system, or a three-engine, four-fan propulsion system, as further described herein.

The first propulsion subsystem 102 includes a first engine core 112 coupled via the BLI fan drive system 108 to the BLI fan 110 (e.g., a first fan). The first engine core 112 is configured to generate power (shaft power) and to apply the power to the BLI fan drive system 108. For example, the first engine core 112 may include or correspond to a gas turbine engine, an electric engine, or a hybrid engine (e.g., a gas and electric engine). In some implementations, the first engine core 112 is coupled to the BLI fan drive system 108 via a gearbox or one or more gears, such as a bevel gear. In such implementations, the first engine core 112 includes or correspond to a turboshaft engine.

In some implementations, the first engine core 112 is configured to receive free stream air, such as at an inlet of the first engine core 112. The first engine core 112 is placed sufficiently far from exterior surfaces (e.g., a skin of the fuselage 202) of the aircraft 201 such that the inlet of the first engine core 112 receives the free stream airflow and does not receive slower boundary layer air that forms along the exterior surfaces of the aircraft 201. The first engine core 112 is configured to compress the free stream air and to combust fuel and the compressed free stream air to rotate a turbine of the engine core to generate power. In a particular implementation, the engine core 112 includes a compressor configured to compress the free stream air, a combustor configured to combust fuel and the compressed free stream air, and a turbine configured to generate the power based on rotation caused by combustion of the fuel and the compressed free stream air. Rotation of the turbine generates the power provided to the BLI fan drive system 108.

The BLI fan drive system 108 is configured to transfer received power from the first engine core 112 to the BLI fan 110. The BLI fan drive system 108 includes a shaft 142 configured to receive the power generated by the first engine core 112 and is configured to transfer the power to the BLI fan 110 to drive the BLI fan 110. To illustrate, power generated by the first engine core 112 is applied to the shaft 142 to rotate the shaft 142, and rotation of the shaft 142 rotates or drives the BLI fan 110. Because rotation of the BLI fan 110 is based on power generated by the first engine core 112, the BLI fan drive system 108 is said to transfer or transmit power to the BLI fan 110. The BLI fan drive system 108 may correspond to a mechanical driveshaft system, as described further with reference to FIG. 3, or a hydraulic drive system, as described further with reference to FIGS. 6 and 7. In other implementations, the BLI fan drive system 108 is configured to transmit or transfer received power from multiple engine cores of the propulsion system 101 to the BLI fan 110, as described further herein.

The BLI fan 110 (e.g., a propulsor) is configured to generate thrust based on rotation of the shaft 142. To illustrate, power applied by the first engine core 112 rotates the BLI fan 110, which accelerates received boundary layer airflow at the BLI fan 110 to generate the thrust. A velocity of the boundary layer airflow is lower than a velocity of free stream airflow. In some implementations, the boundary layer airflow corresponds to airflow from a boundary layer of a fuselage of an aircraft. To illustrate, a front or fore portion of the fuselage encounters the free stream airflow, and as the fuselage moves through the free stream airflow a portion of the free stream airflow near the skin or the exterior of the fuselage is slowed down and forms the boundary layer airflow from interaction with the fuselage.

The BLI fan 110 is coupled to the shaft 142 (e.g., a driveshaft) and rotates in a first direction about an axis of the shaft 142 when the shaft 142 is rotated. In some implementations, the BLI fan 110 is configured to disengage (e.g., decouple) from the shaft 142 via a clutch, such as described with reference to FIGS. 3 and 6. The BLI fan 110 may be disengaged (or decoupled) responsive to a control signal. The BLI fan 110 includes a plurality of blades coupled to a hub. Each of the blades may be curved or otherwise contoured to affect the power generation capability of the plurality of blades, such as to reduce wave drag.

In some implementations, the BLI fan 110 is ducted. In other implementations, the BLI fan 110 is open (e.g., unducted). In a particular implementation, the BLI fan 110 is a propfan propeller (also be referred to as an open rotor design). In some implementations, the BLI fan 110 includes multiple fans (e.g., the BLI fan 110 is a multiple stage fan). The multiple fans may have different placement in relation to one another, may rotate in a second direction, or both. For example, the BLI fan 110 may be a contra-rotating fan that includes a first set of blades that rotate in a first direction and a second set of blades that rotate in a second direction. In some implementations, the BLI fan 110 is configured to receive power from multiple engine cores of the propulsion system 101, as described further herein.

The second propulsion subsystem 104 includes a second engine core 122 coupled to a second fan 124 and collocated with the second fan 124. The second engine core 122 is configured to generate power and apply the power to the second fan 124 to drive the second fan 124. The second engine core 122 may include or correspond to a gas turbine engine, an electric engine, or a hybrid engine (e.g., a gas and electric engine). In some implementations, the second engine core 122 and the second fan 124 include or correspond to a geared turbofan engine. The second fan 124 is configured to generate thrust based on the received power. To illustrate, the second engine core 122 is configured to receive free stream airflow and the second fan 124 is configured to accelerate the received free stream airflow (e.g., a portion of the received free stream airflow).

In some implementations, the second fan 124 is coupled to the second engine core 122 via an internal or primary driveshaft. The second fan 124 may be located in front of or behind the second engine core 122, allowing for the second propulsion subsystem 104 to push (referred to as pusher engine configuration) or pull (referred to as a puller or tractor engine configuration) the aircraft. In some implementations, the second fan 124 is ducted, and the ducted second fan 124 and the second engine core 122 are included in a turbofan engine. In other implementations, the second fan 124 is open (e.g., unducted), and the open second fan 124 and the second engine core 122 are included in a propfan engine.

The second fan 124 is coupled to the second engine core 122 and rotates in a first direction about an axis of the second engine core 122 (or a driveshaft thereof) when the driveshaft is rotated. In some implementations, the second fan 124 and the BLI fan 110 are the same type of fan. In other implementations, the second fan 124 and the BLI fan 110 are different types of fans.

During operation, the propulsion system 101 produces thrust to power an aircraft. To illustrate, the first engine core 112 and the second engine core 122 both ingest free stream airflow (e.g., from different locations). The first engine core 112 and the second engine core 122 both compress the corresponding ingested free stream airflow, mix the corresponding compressed free stream airflow with fuel, and combust the corresponding mixed free stream airflow and fuel to produce power (shaft power).

First power produced by the first engine core 112 is provided to the BLI fan 110 via the BLI fan drive system 108 to drive the BLI fan 110. The BLI fan 110 ingests the boundary layer airflow of the fuselage of the aircraft and accelerates the boundary layer airflow. For example, rotation of the shaft 142 of the BLI fan drive system 108 rotates the BLI fan 110 which increases a velocity of the boundary layer airflow and produces thrust. Accelerating the boundary layer increases the efficiency of the propulsion system 101. Accelerating (or propelling) the slower boundary layer airflow is more efficient and may produce less noise as opposed to accelerating the faster free stream airflow. By positioning an engine core that powers a BLI fan at a location external to the fuselage or wing, the engine core ingests faster free stream air (and thus more momentum) and accordingly generates more power as compared to an engine core that ingests the slower boundary layer airflow.

Second power produced by the second engine core 122 is provided to the second fan 124 to drive the second fan 124. The second fan 124 may be coupled (e.g., via a primary driveshaft of the second engine core 122) to a compressor and a turbine of the second engine core 122. The second fan 124 receives the free stream airflow and propels the free stream airflow to generate thrust based on the second thrust.

In some implementations, the first propulsion subsystem 102 further includes a third fan 114 collocated with the first engine core 112, as described with reference to FIGS. 5-7. In such implementations, the propulsion system 101 corresponds to the two-engine, three-fan configuration. In a particular implementation, the third fan 114 is coupled to the first engine core 112 via an internal or primary driveshaft. The third fan 114 may be positioned in front of or behind the first engine core 112, allowing for the first propulsion subsystem 102 to push or pull the aircraft. In some implementations, the third fan 114 is ducted, and the ducted third fan 114 and the first engine core 112 are included in a turbofan engine. In other implementations, the third fan 114 is open (e.g., unducted), and the open third fan 114 and the first engine core 112 are included in a propfan engine. In a particular implementation (e.g., a symmetrical configuration), the first propulsion subsystem 102 and the second propulsion subsystem 104 are the same type of propulsion subsystem (e.g., a turbofan engine). In other implementations (e.g., asymmetrical configurations), the first propulsion subsystem 102 and the second propulsion subsystem 104 may be different types of propulsion subsystems.

The third fan 114 is configured to rotate in a first direction about an axis of the first engine core 112 (or a driveshaft thereof) when the driveshaft is rotated. In some implementations, the third fan 114 is the same type of fan as the second fan 124, the BLI fan 110, or both. In other implementations, the third fan 114 is a different type of fan than the second fan 124, the BLI fan 110, or both.

During operation of the propulsion system 101 including the third fan 114, a portion of the first power generated by the first engine core 112 is provided to the third fan 114 and used to drive the third fan 114. To illustrate, the third fan 114 is coupled to a compressor and to a turbine of the first engine core 112 (e.g., via a primary driveshaft) and rotation of the turbine drives the third fan 114. In some such implementations, the first engine core 112 is coupled, via an auxiliary driveshaft and a gearbox, to the BLI fan 110, the BLI fan drive system 108, or both.

In some three-fan implementations, the second engine core 122 is further coupled to the BLI fan 110 via the BLI fan drive system 108, and the second engine core 122 is further configured to provide power to the BLI fan 110 via the BLI fan drive system 108 to drive the BLI fan 110. To illustrate, during operation, a portion of the second power generated by the second engine core 122 is provided to BLI fan 110 and used to drive the BLI fan 110. In some implementations, the second engine core 122 is coupled to the BLI fan drive system 108 via an auxiliary driveshaft and a gearbox or one or more gears. In some three-fan implementations, the propulsion system 101 is configured to adjust a thrust ratio between the BLI fan 110 and the second fan 124, between the BLI fan 110 and the third fan 114, or both. For example, the propulsion system 101 may increase the thrust ratio between the BLI fan 110 and a non-BLI fan during cruise and may decrease the thrust ratio during take-off to further increase the benefit of the increased efficiency of the BLI fan 110. In other three-fan implementations, the thrust ratio between the BLI fan 110 and the second fan 124 and the thrust ratio between the BLI fan 110 and the third fan 114 are fixed (e.g., non-adjustable).

In some implementations, the aircraft is a three-engine aircraft (e.g., a trijet) and the propulsion system 101 further includes a third propulsions subsystem 106, as described with reference to FIG. 8. The third propulsion subsystem 106 includes a third engine core 132. In some three-engine aircraft implementations, the first engine core 112 is coupled to a tail of the aircraft or is integrated into the tail. The second engine core 122 and the third engine core 132 may be mounted to the fuselage 202 or the wings 204. In some three-engine aircraft implementations, the third fan 114 is collocated with the third engine core 132 and is not collocated with the first engine core 112. The first engine core 112 is coupled to the BLI fan 110 and provides the power to drive the BLI fan 110. In some implementations, one or more of the second engine core 122 or the third engine core are coupled to the BLI fan 110 and provide power to drive the BLI fan 110. Operation of three engine propulsion systems is further described with reference to FIG. 8.

In some three-engine aircraft implementations, the propulsion system 101 is implemented using a four-fan configuration. To illustrate, the third propulsion subsystem 106 further includes a fourth fan 134 collocated with the third engine core 132. In four-fan configurations, the third fan 114 is collocated with the first engine core 112. Operation of four-fan configurations is further described with reference to FIG. 8.

In some two-engine or three-engine implementations, the BLI fan drive system 108 is configured to dynamically adjust an amount of power provided to the BLI fan 110 from the first engine core 112 and one or more other engine cores, such as the second engine core 122. For example, the amount of power provided by the first engine core 112 and the second engine core 122 to the BLI fan 110 may be adjusted based on a flight phase or a thrust setting (e.g., a desired thrust or a thrust level input). To illustrate, a controller (e.g. a full authority digital engine control (FADEC) system) is configured to send one or more commands to the BLI fan drive system 108 to increase an amount of power provided to the BLI fan 110 during cruise. Additionally or alternatively, the controller (e.g. the FADEC system) is configured to send one or more commands to the BLI fan drive system 108 to decrease an amount of power provided to the BLI fan 110 during takeoff. To illustrate, the BLI fan drive system 108 may change gears, adjust fan blade pitch, adjust fan nozzle area, or adjust valves to receive ("siphon") an adjustable amount of power generated by one or more of the engine cores 112, 122, and 132. Thus, when a higher efficiency is desired, the BLI fan 110 (which reduces drag) can be utilized to generate a greater degree of thrust. Additionally, when more thrust is desired and or when the aircraft is moving at lower speeds (e.g., when a difference between the velocity of the free stream airflow and the velocity of the boundary airflow is relatively low, such as during takeoff), the second fan 124 and the third fan 114 can be utilized to a greater degree or the BLI fan 110 can be unpowered to reduce power losses incurred from transmitting power to the BLI fan 110.

Figure 2:
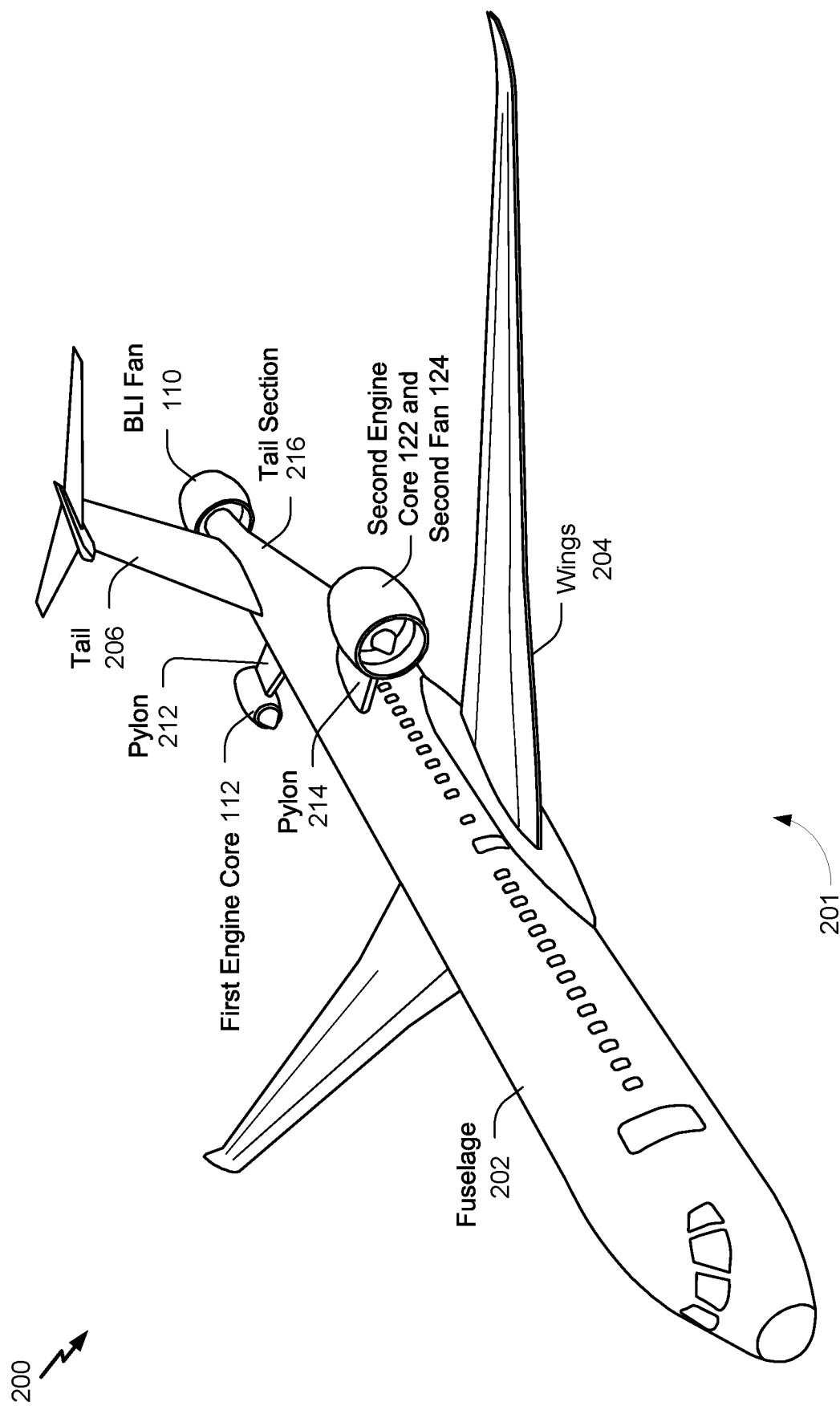
FIG. 2 is a diagram of a first example of an aircraft including a BLI propulsion system.

FIG. 2 is a diagram 200 of a first example of an aircraft 201 including a BLI propulsion system, such as the propulsion system 101 of FIG. 1. The aircraft 201 includes two engine cores and two fans, such as the engine cores 112 and 122 and the fans 110 and 124. In other implementations, the aircraft 201 includes more than two fans or more than two engines, such as described with reference to FIGS. 5-8. The aircraft 201 includes a fuselage 202 (including a tail section 216), a pair of wings 204, and a tail 206 (e.g., an empennage). As illustrated in FIG. 2, the tail 206 includes a "T-tail" where horizontal stabilizers are coupled to a vertical stabilizer and positioned at a distal end of the vertical stabilizer with reference to the fuselage 202.

As shown in FIG. 2, the tail section 216 of the fuselage 202 is shaped, contoured, or sloped to create entry paths for boundary layer airflow to reach the BLI fan 110. The contoured shape of the tail section 216, with its smooth contours, allows the boundary layer air to flow along the exterior of the fuselage 202 (e.g., to remain "attached" to the fuselage and to not "separate" from the fuselage 202) and be funneled towards the BLI fan 110. The contoured shape of the tail section 216 provides connection points for attachment to the BLI fan 110, such as with structural longerons. As shown in FIG. 2, the tail section 216 is designed to integrate smoothly with the rest of the fuselage 202 and, in some embodiments, with the tail 206.

The first engine core 112 is coupled via an external pylon 212 to the fuselage 202 aft of the pair of wings 204. In some implementations, the first engine core 112 is coupled to the fuselage 202 via a pylon associated with the BLI fan 110. For example, the first engine core 112 is coupled to a nacelle of the BLI fan 110 and the nacelle includes a pylon that supports the first engine core 112 and transfers the load of the first engine core 112 to the fuselage 202.

Figure 4:
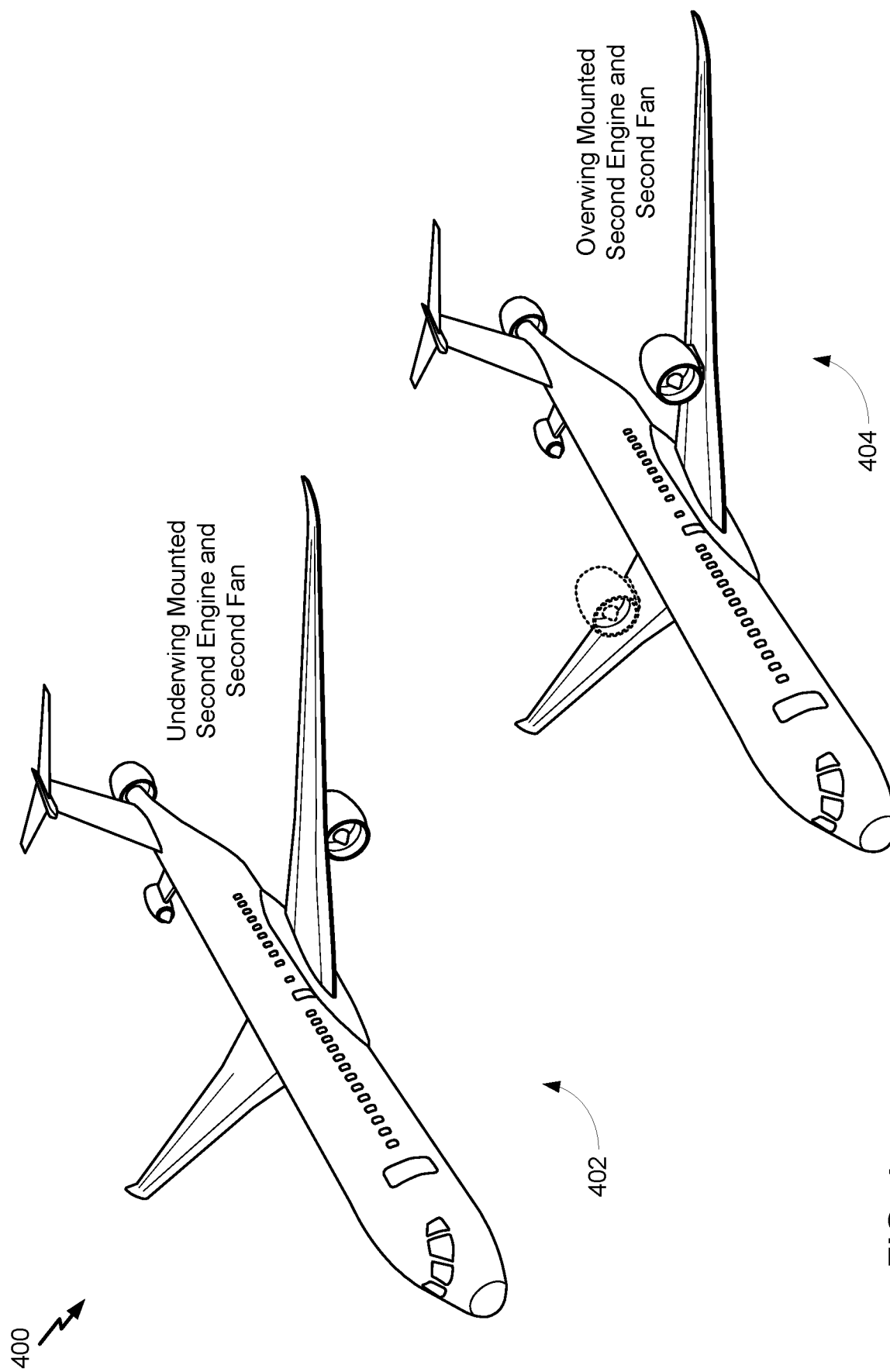
FIG. 4 is a diagram of second and third examples of an aircraft including a BLI propulsion system.

As illustrated in FIG. 2, the second engine core 122 and the second fan 124 are coupled via an external pylon 214 to the fuselage 202 aft of the pair of wings 204 and are not aligned (e.g., with respect to a pitch axis of the aircraft 201) with the first engine core 112. In the implementation illustrated in FIG. 2, the first engine core 112 is coupled to the fuselage 202 further aft of the second engine core 122 and the second fan 124. By positioning the first engine core 112 aft of the second engine core 122, the BLI fan drive system 108 is shorter and lighter because the first engine core 112 is closer to the BLI fan 110. In other implementations, the second engine core 122 and the second fan 124 are coupled to a particular wing of the pair of wings 204, as illustrated in FIG. 4, or the second engine core 122 and the second fan 124 are coupled to fuselage 202 and aligned (e.g., with respect to the pitch axis of the aircraft 201) with the first engine core 112, as illustrated in FIG. 5.

The BLI fan 110 is coupled to the first engine core 112 via the BLI fan drive system 108, as illustrated and described with reference to FIG. 3. The BLI fan 110 is coupled to the tail section 216 of the fuselage 202. As illustrated in FIG. 2, the BLI fan 110 is positioned aft of the tail 206 (e.g., aft of the vertical stabilizer of the aircraft 201 and a circumference of an inlet of the BLI fan 110 is greater than (e.g., encompasses) a particular circumference of the fuselage 202 (e.g., the tail section 216 of the fuselage 202). Because the inlet of the BLI fan 110 encompasses the particular circumference of the fuselage 202, the BLI fan 110 receives a majority of the boundary layer airflow of the fuselage 202 (and the aircraft 201). In a particular implementation, the tail section 216 of the fuselage 202 tapers (e.g., the circumference of the fuselage 202 decreases) in the fore-to-aft direction with respect to the aircraft 201, as illustrated in FIG. 2. The boundary layer airflow (or a portion thereof) along the fuselage 202 follows the tapering geometry of the tail section 216 which directs the boundary layer airflow into the BLI fan 110. Additionally, because of the tapering geometry of the tail section 216, the BLI fan 110 receives boundary layer airflow while the circumference of the inlet of the BLI fan 110 is less than a maximum circumference of the fuselage 202.

Figure 3:
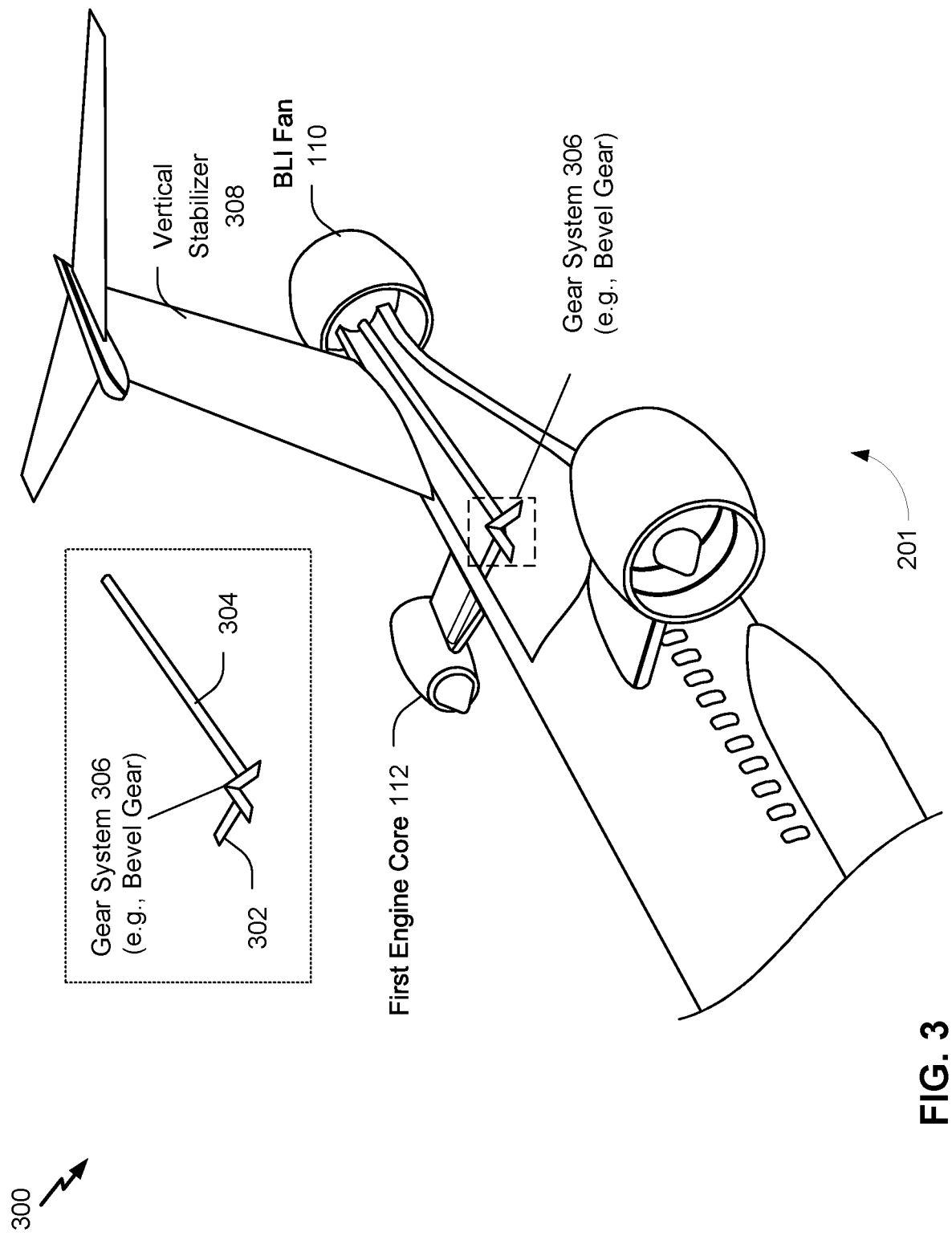
FIG. 3 is a diagram of an example of a drive system of an aircraft including a BLI propulsion system.

Referring to FIG. 3, a diagram 300 depicts an example of a drive system (e.g., the BLI fan drive system 108 of FIG. 1) of the aircraft 201. In FIG. 3, the drive system includes or corresponds to a mechanical driveshaft system. In other implementations, the drive system includes or corresponds to a hydraulic drive system, as described with reference to FIG. 6.

As illustrated in FIG. 3, the first engine core 112 is coupled to the BLI fan 110 via a first shaft 302, a second shaft 304, and a gear system 306. The first shaft 302 is coupled to the first engine core 112 and to the gear system 306. In some implementations, the first shaft 302 is coupled to a free turbine (also called a power turbine) of the first engine core 112. The first shaft 302 and the free turbine (or power turbine) may be referred to as a free (or power) spool. The free turbine is fluidly coupled (via exhaust gases) to a compressor and a turbine (a compressor spool) of the first engine core 112. As an illustrative example, the free turbine extracts heat energy from the exhaust gases generated by the first engine core 112 and converts the heat energy into output shaft power. The free turbine transfers (or transmits) the shaft power via the first shaft 302. To illustrate, the hot exhaust gases generated by the compressor spool (the compressor and the turbine) rotate the free turbine, and rotation of the free turbine causes the first shaft 302 to rotate.

The second shaft 304 is coupled to the BLI fan 110 and to the gear system 306. Rotation of the second shaft 304 drives or rotates the BLI fan 110. In some implementations, the second shaft 304 includes or corresponds to the shaft 142 of FIG. 1. In other implementations, the second shaft 304 is coupled to the shaft 142 of FIG. 1. The gear system 306 is configured to rotate the second shaft 304 based on rotation of the first shaft 302. In a particular implementation, the gear system 306 includes a bevel gear. Additionally or alternatively, the gear system 306 may include a miter gear, a helical gear, a worm gear, or other types of gears. In some implementations, the gear system 306 is configured to adjust (e.g., increase or decrease) a drive ratio (e.g., a gear ratio) of received torque (power divided by rotational speed) to output torque. Increasing the drive ratio of the gear system 306 increases torque output and decreases rotational speed output, and decreasing the drive ratio decreases torque output and increases rotational speed output. By adjusting the drive ratio, the gear system 306 can adjust a speed at which the BLI fan 110 rotates, and thus an amount of thrust generated by the BLI fan 110.

In some implementations, the aircraft 201 includes thrust reversers configured to generate reverse thrust or to direct thrust generated by a fan in a reverse direction (e.g., towards a nose of the aircraft 201). For example, the second propulsion subsystem 104 may include a clam shell type thrust reverser, a cold stream type thrust reverser, or adjustable pitch blades. Additionally or alternatively, the BLI fan 110 may include a thrust reverser. In a particular example, the BLI fan 110 includes adjustable pitch blades and the BLI fan 110 is configured to generate reverse thrust by adjusting a pitch of the adjustable pitch blades from a first pitch value to a second pitch value. In another particular example, the BLI fan 110 is configured to be driven in reverse. To illustrate, a clutch coupled to the BLI fan 110 may include different gears or valves configured to drive the BLI fan 110 in reverse or to generate a force to oppose forward rotation of the BLI fan 110. In other implementations, the BLI fan 110 is disengaged (or decoupled) from the engine core 112 to stop the BLI fan 110 from receiving power from one or more of the engine cores. For example, the free/power turbine may be decoupled from the first shaft 302 by a clutch or de-coupler. As another example, the second shaft 304 may be decoupled from the BLI fan 110 by a clutch or de-coupler.

During operation, the first engine core 112 generates power, as described with reference to FIG. 1, to rotate the first shaft 302. In a particular implementation, the free/power turbine of the first engine core 112 generates power from exhaust gases generated by the turbine (the compressor turbine) of the first engine core 112 and transfers the power to the first shaft 302. The first shaft 302 transfers the power to the second shaft 304 via the gear system 306. The second shaft 304 applies the power to drive the BLI fan 110. The BLI fan 110 generates thrust based on the power applied by the second shaft 304 (e.g., based on rotation of the second shaft 304). By using a mechanical or driveshaft BLI fan drive system, a greater amount of power generated by the first engine core 112 is applied to the BLI fan 110, as compared to using electrical or hydraulic drive systems. To illustrate, the mechanical or driveshaft BLI fan drive system reduces transmission losses and conversion losses as compared to hydraulic or electrical drive systems. As an illustrative, non-limiting example, the gear system 306 may have approximately 98 percent efficiency.

FIG. 4 is a diagram of second and third examples of the aircraft 201 including a BLI propulsion system. FIG. 4 includes a second example 402 of the aircraft 201 that includes the second engine core 122 and the second fan 124 mounted under a wing of the aircraft 201 (e.g., underwing mounting). Because the second engine core 122 and the second fan 124 are mounted under the wing of the aircraft 201, less engine noise propagates to the fuselage 202 and the engines are easier to access for maintenance, as compared to aircraft with engines mounted over a wing of an aircraft (e.g., overwing mounting).

FIG. 4 includes a third example 404 of the aircraft 201 that includes the second engine core 122 and the second fan 124 mounted over a wing of the aircraft 201. Because the second engine core 122 and the second fan 124 are mounted over the wing of the aircraft 201, a ground clearance threshold of the aircraft 201 decreases, which enables use of shorter and lighter landing gear, as compared to the second example 402.

Additionally, less engine noise propagates to the ground and the second engine core 122 may produce more lift (e.g., due to the Coandäeffect), as compared to aircraft with underwing mounted engines.

In other implementations, such as described with reference to FIGS. 8 and 9, the aircraft 201 includes a third engine core. An exemplary third engine core is illustrated in the third example 404 of FIG. 2 as being coupled to another wing of the aircraft 201. The third engine core may be coupled to a fuselage or a tail of the aircraft 201 in other three engine configurations, as described with reference to FIGS. 8 and 9.

The engine and fan configurations illustrated in FIGS. 2-4 are asymmetrical. The asymmetrical configurations illustrated in and described with reference to FIGS. 2-4 offer improved longitudinal balance as compared to aircraft with rear mounted engines. Additionally, the asymmetrical configurations offer better fuel economy as compared to conventional aircraft and some BLI aircraft (e.g., BLI aircraft with electrical drive systems or with engine cores collocated with BLI fans). Additionally, the asymmetrical configurations improve safety as compared to conceptual BLI aircraft having two engine cores side-by-side or having engine cores inside the fuselage.

Figure 5:
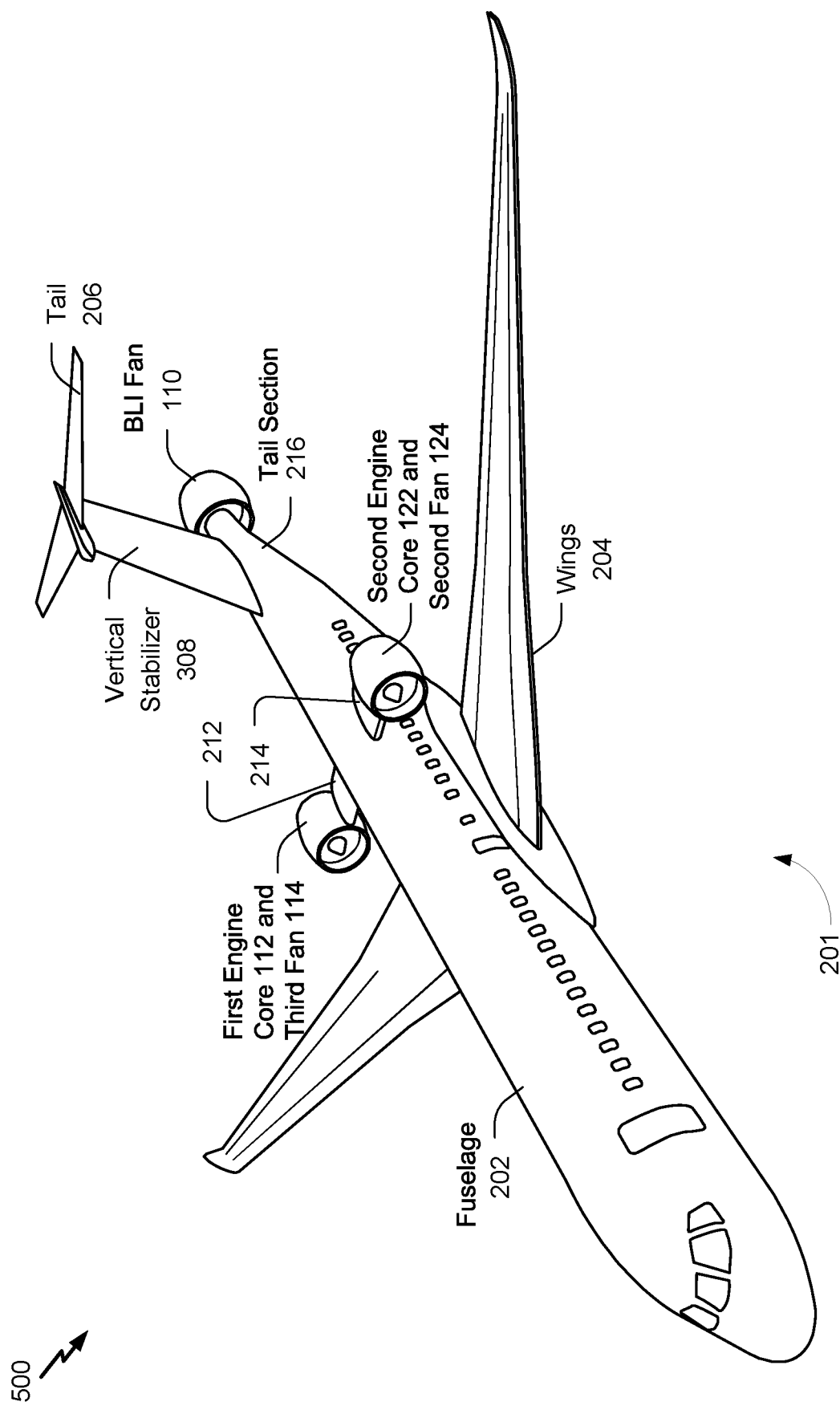
FIG. 5 is a diagram of a fourth example of an aircraft including a BLI propulsion system.

Referring to FIG. 5, a fourth example 500 of an aircraft including a BLI propulsion system is depicted. As compared to the two-fan aircraft of FIGS. 2-4, FIGS. 5-7 are directed to example aircraft and propulsion systems that include three fans. In such implementations, the aircraft 201 includes the third fan 114 that is coupled to the first engine core 112 via a driveshaft (e.g., an internal driveshaft or a primary driveshaft). The first engine core 112 is further configured to rotate the driveshaft to drive the third fan 114.

As illustrated in FIG. 5, the third fan 114 is collocated with the first engine core 112. The third fan 114 is similar to the second fan 124, as described with reference to FIG. 1. Additionally, the first engine core 112 and the second engine core 122 are coupled via the BLI fan drive system 108 of FIG. 1 to the BLI fan 110 and are configured to drive the BLI fan 110.

In a particular implementation, the first engine core 112, the third fan 114, and the driveshaft are included in or correspond to a turbofan engine (e.g., a geared turbofan engine or a high-bypass turbofan engine). In other implementations, the first engine core 112, the third fan 114, and the driveshaft are included in or correspond to a turboprop engine, a propfan engine, or a turbojet engine. In some implementation, the first engine core 112 and the third fan 114 are included in the same type of propulsion subsystem as the second engine core 122 and the second fan 124. In other implementations, the first engine core 112 and the third fan 114 and the second engine core 122 and the second fan 124 are included in different types of propulsion subsystem.

In some implementations, the BLI fan drive system 108 includes a transmission or a transmission system configured to control transfer of torque (or power) to the BLI fan 110. For example, the transmission or transmission system may provide more power during one flight phase (e.g., cruise) of the aircraft 201 and less power or no power during another flight stage (e.g., takeoff) of the aircraft 201.

Although the engine cores 112 and 122 are illustrated as being coupled to the fuselage 202 via the external pylons 212 and 214 in FIG. 5, in other implementations the engine cores 112 and 122 may be coupled to the wings 204, as illustrated with reference to FIG. 4, or the tail 206. For example, the first engine core 112 is coupled to a first wing of the wings 204 and the second engine core 122 is coupled to a second wing of the wings 204. By coupling the engine cores 112 and 122 to the wings 204, stability and balance of the aircraft 201 is improved as compared to coupling the engine cores 112 and 122 to the tail 206. Alternatively, by coupling the engine cores 112 and 122 to the tail 206, the BLI fan drive system 108 is shorter, less complex, and lighter as compared to coupling the engine cores 112 and 122 to the wings 204. In some such implementations, the first engine core 112 and the second engine core 122 are coupled to the vertical stabilizer 308 of the tail 206. For example, the first engine core 112 and the second engine core 122 are coupled to the vertical stabilizer 308 of the tail 206 via pylons.

Figure 6:
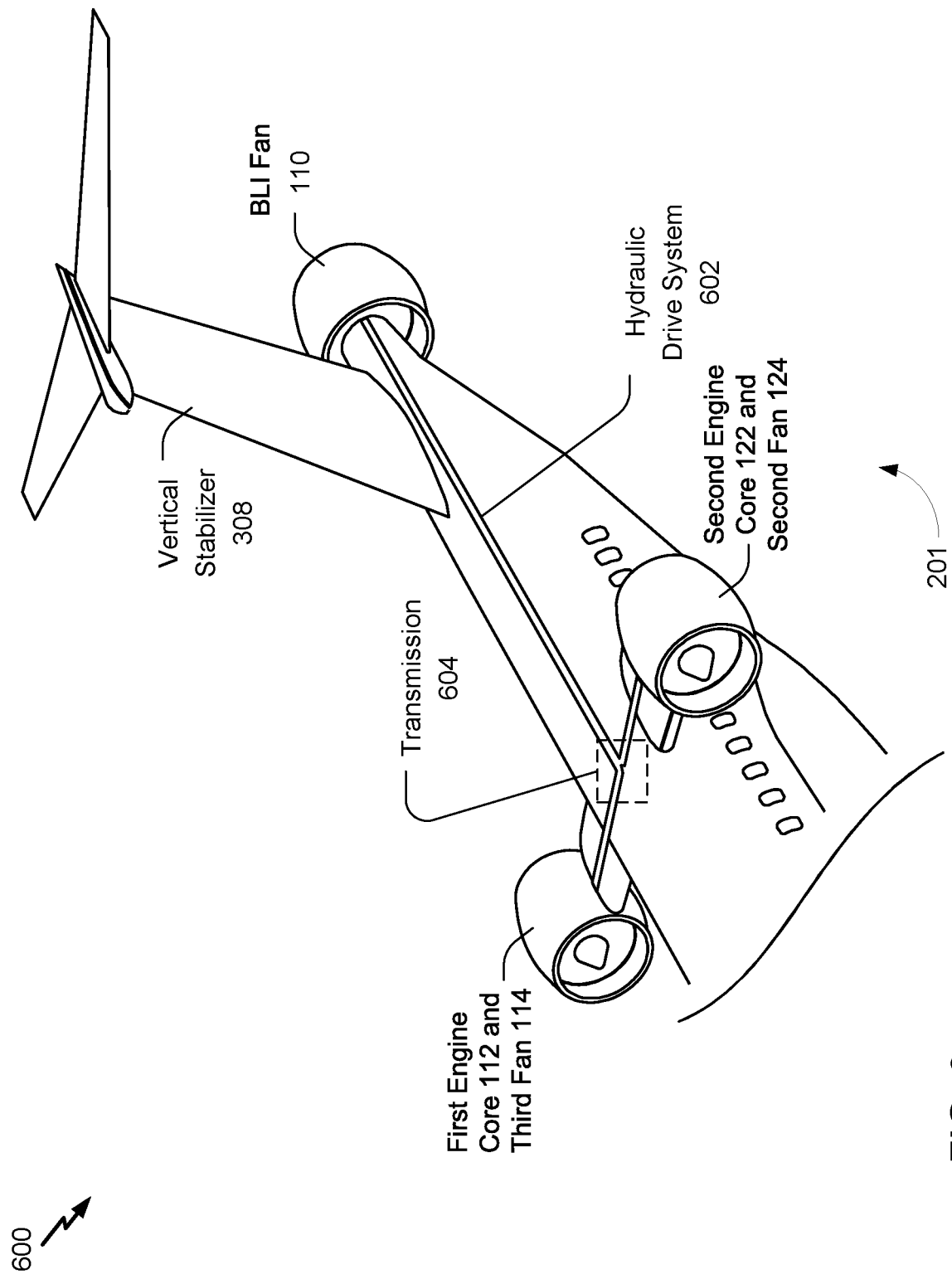
FIG. 6 is a diagram of an example of a hydraulic drive system of an aircraft including a BLI propulsion system.

FIG. 6 illustrates a particular example 600 of a BLI fan drive system of the example of the aircraft 201 illustrated in FIG. 5. In a particular implementation, the BLI fan drive system includes or corresponds to the BLI fan drive system 108 included in the propulsion system 101 of FIG. 1. As illustrated in FIG. 6, the BLI fan drive system 108 includes a hydraulic drive system 602 and a transmission 604. The hydraulic drive system 602 is configured to receive power generated by one or more of the engine cores 112 and 122 and to transfer the received power to the BLI fan 110 via the shaft 142. To illustrate, the hydraulic drive system 602 increases a pressure of hydraulic fluid based on the received power, and the pressurized hydraulic fluid is used to apply power to the BLI fan 110. The hydraulic drive system 602 is described further with reference to FIG. 7. The transmission 604 may include a clutch assembly, such as a hydraulic clutch assembly. The transmission 604 is configured to control a speed of an output shaft of the engine cores 112 and 122.

In other implementations, the first engine core 112 and the second engine core 122 are coupled via a driveshaft system to the BLI fan, as described with reference to FIG. 4. In some such implementations, each engine core is coupled to the BLI fan 110 (e.g., the shaft 142 of the BLI fan 110) via a pair of driveshafts and a gear system, as described with reference to FIG. 3. In other implementations, each engine core (e.g., an output shaft thereof) is coupled via a shared gear system to the shaft 142 and configured to apply power to rotate the shaft 142. Rotation of the shaft 142 drives the BLI fan 110.

Figure 7:
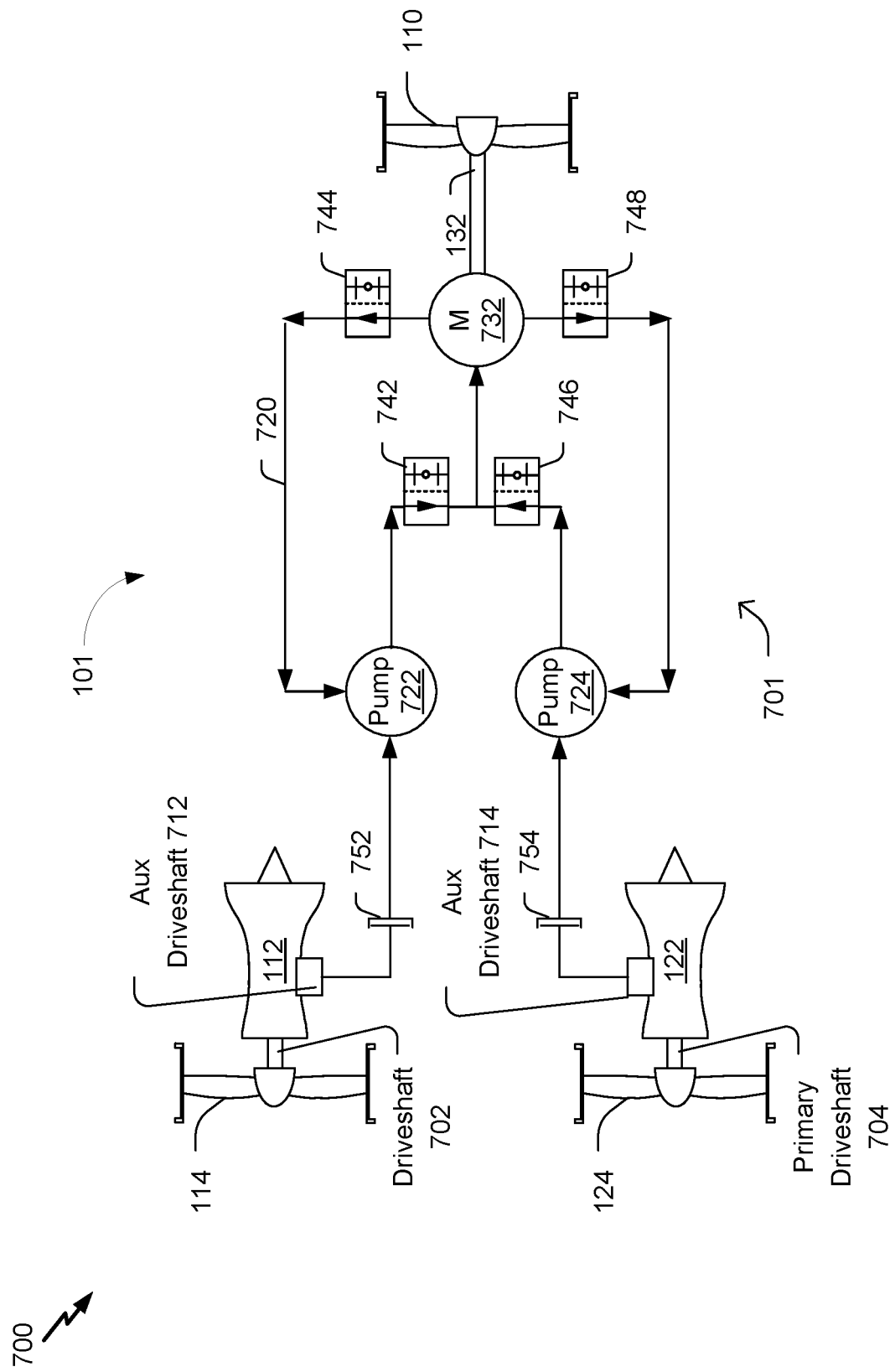
FIG. 7 is a schematic illustration of an example of a hydraulic drive system.

FIG. 7 is a schematic illustration of an example 700 configuration of the propulsion system 101 that includes a hydraulic drive system 701. The hydraulic drive system 701 may include or correspond to the BLI fan drive system 108 of FIG. 1. The propulsion system 101 includes the first engine core 112, the second engine core 122, the BLI fan 110, the second fan 124, and the third fan 114 of FIG. 1. The propulsion system 101 also includes a hydraulic circuit 720, such as the hydraulic drive system 602 of FIG. 6.

As illustrated in FIG. 7, the first engine core 112 is coupled to the third fan 114 via a primary driveshaft 702 and is coupled to the hydraulic drive system 701 via an auxiliary driveshaft 712. The second engine core 122 is coupled to the second fan 124 via a primary driveshaft 704 and is coupled to the hydraulic drive system 701 via an auxiliary driveshaft 714.

The hydraulic drive system 701 includes the hydraulic circuit 720 that includes a first pump 722, a second pump 724, and a hydraulic motor 732. The pumps 722 and 724 are configured to generate pressure to move hydraulic fluid through the hydraulic circuit 720. As an illustrative, non-limiting example, each of the pumps 722 and 724 is a hydraulic pump, such as a geared pump, a rotatory vane pump, a screw pump, a centrifugal pump, a piston pump, or other types of hydraulic pumps. The hydraulic motor 732 is configured to generate power based on the pressurized hydraulic fluid and apply the power via the shaft 142 to the BLI fan 110. For example, the hydraulic motor 732 applies power to the shaft 142 to cause the shaft 142 to rotate, thereby driving the BLI fan 110. The components of the hydraulic circuit 720 are in flow communication with each other such that hydraulic fluid may flow from one component to another component.

In some implementations, the hydraulic circuit 720 includes one or more valves. In the implementation illustrated in FIG. 7, the hydraulic circuit 720 includes four two-position valves 742-748. The two-position valves 742-748 have an open position and a closed positioned and are configured to enable the hydraulic fluid to move through the hydraulic circuit 720 when in the open position and to impede (or inhibit) movement of the hydraulic fluid when in the closed position. In other implementations, variable flow rate valves or multi-position valves may be used in addition to, or in the alternative to, one or more of the two-position valves 742-748. Variable flow rate valves or multi-position valves enable a controller to selectively adjust an amount of power applied to the BLI fan 110.

In some implementations, the propulsion system 101 includes one or more de-couplers. As illustrated in the particular implementation of FIG. 7, a first de-coupler 752 is coupled to the auxiliary driveshaft 712 and to the first pump 722, and a second de-coupler 754 is coupled to the auxiliary driveshaft 714 and to the second pump 724. The de-couplers 752 and 754 are configured to selectively decouple the engine cores 112 and 122 from the pumps 722 and 724. Decoupling the engine cores 112 and 122 from the pumps 722 and 724 stops power transmission to the BLI fan 110. For example, the engine cores 112 and 122 may be decoupled from the BLI fan 110 during descent. In a particular implementation, each of the de-couplers 752 and 754 is implemented as a clutch, such as a hydraulic clutch assembly. For simplicity, additional components of the hydraulic circuit 720 have been not shown for clarity. The additional components may include a fill port, a pressure gauge, a controller, an accumulator, a reservoir, a heat exchanger, or other hydraulic components.

During operation, the first engine core 112 generates first power and a portion of the first power is transferred via the auxiliary driveshaft 712 to the first pump 722. The second core 122 generates second power and a portion of the second power is transferred via the auxiliary driveshaft 714 to the second pump 724. The pumps 722 and 724 generate pressure based on the power to move the hydraulic fluid through the hydraulic circuit 720 and increase a pressure on the hydraulic fluid. The pressurized hydraulic fluid flows through the valves 742 and 746 to the hydraulic motor 732, and the hydraulic motor 732 generates power due to the movement of the pressurized hydraulic fluid. The hydraulic motor 732 applies the power to rotate the shaft 142, which drives the BLI fan 110. After the hydraulic motor 732 generates the power, the hydraulic fluid flows through the valves 744 and 748 back to the pumps 722 and 724.

In some implementations, the propulsion system 101 includes a controller configured to adjust an amount of power provided to the BLI fan 110. The controller is configured to generate the control signals responsive to user input (e.g., a desired thrust setting) or to input from a flight computer, and to send the control signals to elements of the propulsions system 101 to control the amount of power based on the user input or the input from the flight computer. As an illustrative example, the controller is configured to control the de-couplers 752 and 754, the two-position valves 742-748, variable flow rate valves, or a combination thereof, to adjust the amount of power provided to the BLI fan 110. In a particular implementation, the controller sends a control signal to the de-coupler 754 to decouple the second engine core 122 from the second pump 724 and the BLI fan 110, which reduces power provided to the BLI fan 110. Additionally or alternatively, the controller sends a control signal to the two-position valves 746 and 748 to switch the two-position valves 746 and 748 to the closed configuration the close a portion of the hydraulic circuit 720 to reduce the amount of power provided to the BLI fan 110. As another example, the controller is configured to adjust one or more variable flow rate valves of the hydraulic circuit 720 to adjust the amount of power provided to the BLI fan 110.

Although two pumps 722 and 724 are illustrated in FIG. 7, in other implementations, the propulsion system includes a single pump that is coupled to both auxiliary driveshafts 712 and 714. Additionally, although one hydraulic motor is illustrated in FIG. 7, in other implementations the hydraulic drive system 701 includes more than one hydraulic motor. For example, each of the pumps 722 and 724 may be coupled to a corresponding hydraulic motor. In a particular implementation, each pair of pump and hydraulic motor may be included in different hydraulic circuits that include corresponding driveshafts coupled to the BLI fan 110 (e.g., the shaft 142). In other implementations, the pumps 722 and 724 are coupled to the primary driveshafts 702 and 704 of the engine cores 112 and 122. As illustrated in FIG. 7, the hydraulic drive system 701 includes a hydrodynamic hydraulic drive system. In other implementations, hydraulic drive system 701 includes a hydrostatic hydraulic drive system.

As compared to electrical drive systems, a hydraulic drive system has increased efficiency, such that less power is lost during transmission and conversion of received power to output power. As compared to mechanical driveshaft systems, a hydraulic drive system has increased flexibility in engine core placement and lower design costs. For example, hydraulic drive systems do not utilize driveshafts routed through the fuselage of the aircraft. In implementations where the engine cores are positioned more distant from a BLI fan (e.g., such as coupled to the wings), a hydraulic drive system may weigh less than a corresponding mechanical driveshaft system.

Figure 8:
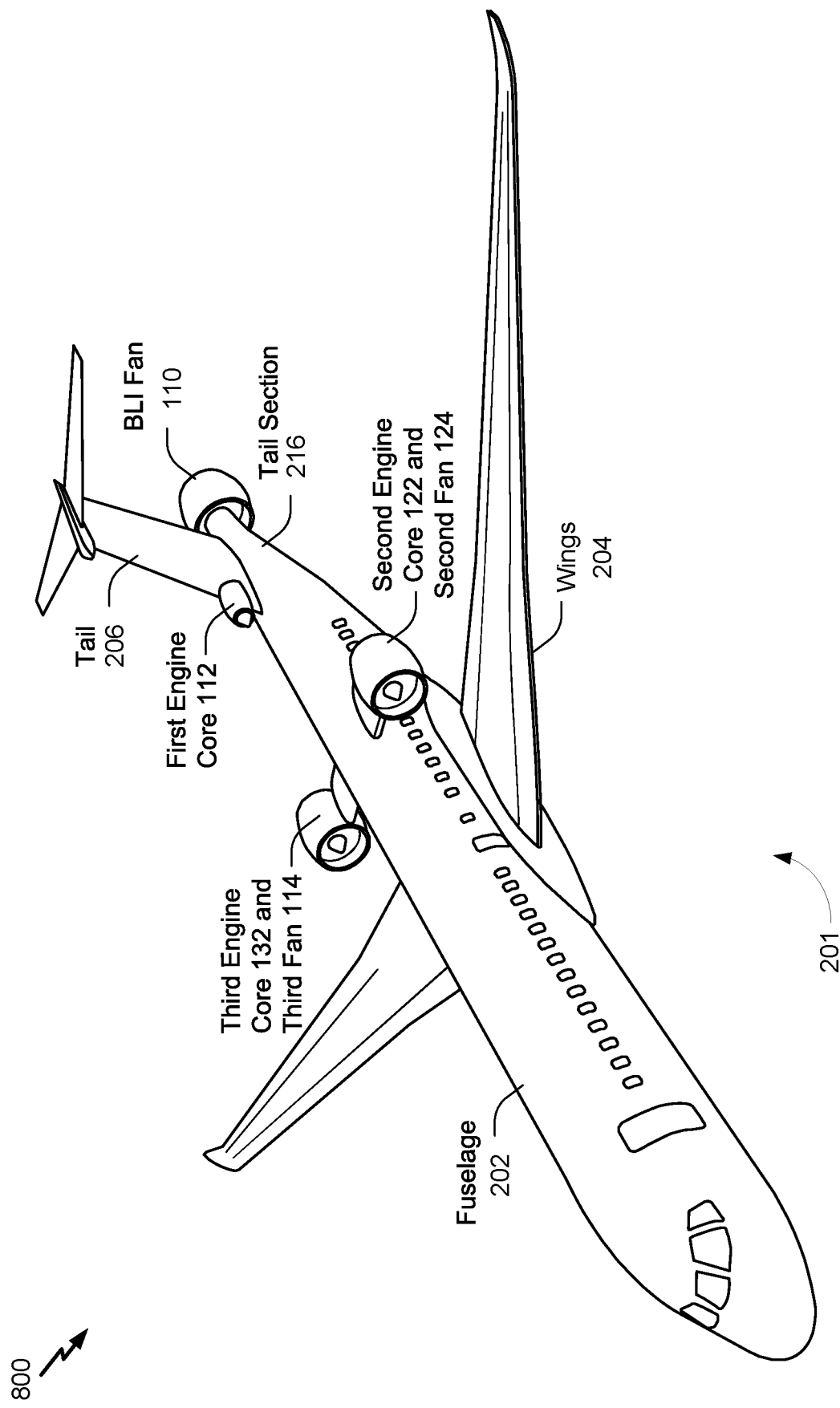
FIG. 8 is a diagram of a fifth example of an aircraft including a BLI propulsion system.

Referring to FIG. 8, a fifth example 800 of an aircraft including a BLI propulsion system is depicted. As compared to the two-engine aircrafts of FIGS. 2-7, FIGS. 8 and 9 are directed to example aircraft and propulsion systems that include more than two engines (e.g., three engines). In the fifth example 800, the aircraft 201 includes the propulsion system 101 that includes the first engine core 112 coupled to the tail 206 of the aircraft 201 and includes the second engine core 122 coupled to the fuselage 202, and the third engine core 132 coupled to the fuselage 202. In other implementations the second engine core 122 and the third engine core 132 are coupled to the wings 204.

In the implementation illustrated in FIG. 8, the first engine core 112 is integrated with the tail 206 of the aircraft 201. For example, the first engine core is integrated with the vertical stabilizer of the tail 206. The second engine core 122 and the third engine core 132 are coupled to the fuselage 202 aft of the wings 204. Additionally, the third engine core 132 is coupled to and collocated with the third fan 114 (instead of the third fan 114 being coupled to the first engine core 112, as described with reference to FIGS. 1-7). The third engine core 132 is configured to generate power to drive the third fan 114, thereby causing the third fan 114 to generate thrust. The third engine core 132 and the third fan 114 may be included in or correspond to a turbofan engine, a turboprop engine, or a propfan engine.

During operation, the engine cores 112, 122, and 132 generate power and apply the power to their respective fans to cause the fans the fans 110, 114, and 124 to generate thrust. To illustrate, the first engine core 112 receives free stream air, generates power based on the free stream air, and applies the power to the drive the BLI fan 110. The BLI fan 110 receives boundary layer airflow and accelerates the boundary layer airflow due to applied power. The second engine core 122 and the third engine core 132 receive free stream air, generate power based on the free stream air, and apply power to drive the second fan 124 and the third fan 114 respectively. The second fan 124 and the third fan 114 accelerate the received free stream air to generate thrust. Additionally, one or more of the second engine core 122 or the third engine core 132 may provide a portion of the generated power to the BLI fan 110 to drive the BLI fan 110 similar to as described with reference to FIGS. 3, 6, and 7.

Figure 9:
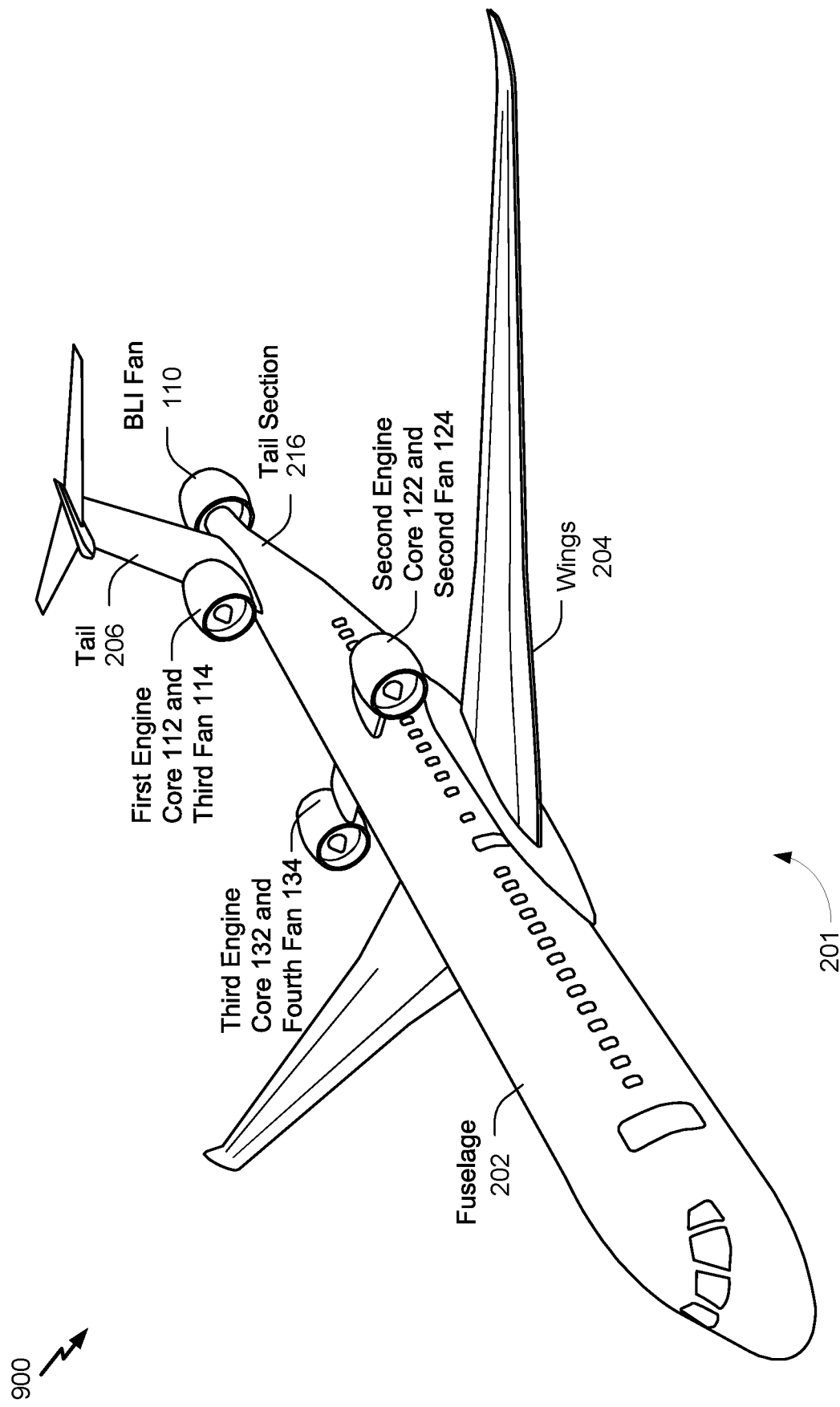
FIG. 9 is a diagram of a sixth example of an aircraft including a BLI propulsion system.

Referring to FIG. 9, a sixth example 900 of an aircraft including a BLI propulsion system is depicted. In the sixth example 900, the aircraft 201 includes a four-fan configuration. In a particular implementation, the aircraft 201 includes the fans 110, 114, 124, and 134 of FIG. 1. The engine cores 112, 122, and 132 of the BLI propulsion system may be coupled to the aircraft 201, as described with reference to FIG. 8. The BLI propulsion system illustrated in FIG. 9 may include or correspond to the propulsion system 101 of FIG. 1

In the implementation illustrated in FIG. 9, the first engine core 112 is coupled to and collocated with the third fan 114. The first engine core 112 is configured to drive the third fan 114, which causes the third fan 114 to generate thrust. The first engine core 112 and the third fan 114 may be included in or correspond to a turbofan engine, a turboprop engine, or a propfan engine. The second engine core 122 is coupled to and collocated with the second fan 124. The second engine core 122 is configured to generate power to drive the second fan 124, which causes the second fan 124 to generate thrust. Additionally, the third engine core 132 is coupled to and collocated with the fourth fan 134. The third engine core 132 is configured to generate power to drive the fourth fan 134, which causes the fourth fan 134 to generate thrust. The second engine core 122 and the second fan 124, the third engine core 132 and the fourth fan 134, or both, may be included in or correspond to a turbofan engine, a turboprop engine, or a propfan engine.

During operation, the engine cores 112, 122, and 132 generate power and apply the power to their respective fans to cause the respective fans to generate thrust. To illustrate, the first engine core 112 receives free stream air, generates power based on the free stream air, and applies a first portion of the power to a BLI fan drive system (e.g., the BLI fan drive system 108 of FIG. 1) to drive the BLI fan 110. The first engine core 112 applies a second portion of the power to an internal or primary driveshaft to drive the third fan 114. The BLI fan 110 receives boundary layer airflow and accelerates the boundary layer airflow due to the applied power to generate thrust. The third fan 114 receives free stream air and accelerates the free stream air based on the second portion of the power to generate thrust. The second engine core 122 and the third engine core 132 receive free stream air, generate power based on the free stream air, and apply the power (e.g., via internal or primary driveshafts) to drive the second fan 124 and the fourth fan 134, respectively. The second fan 124 and the fourth fan 134 accelerate the received free stream air to generate thrust due to the applied power. Additionally, one or more of the second engine core 122 or the third engine core 132 may provide a portion of the generated power to the BLI fan 110 to drive the BLI fan 110, similar to as described with reference to FIGS. 3, 6, and 7.

Figure 10:
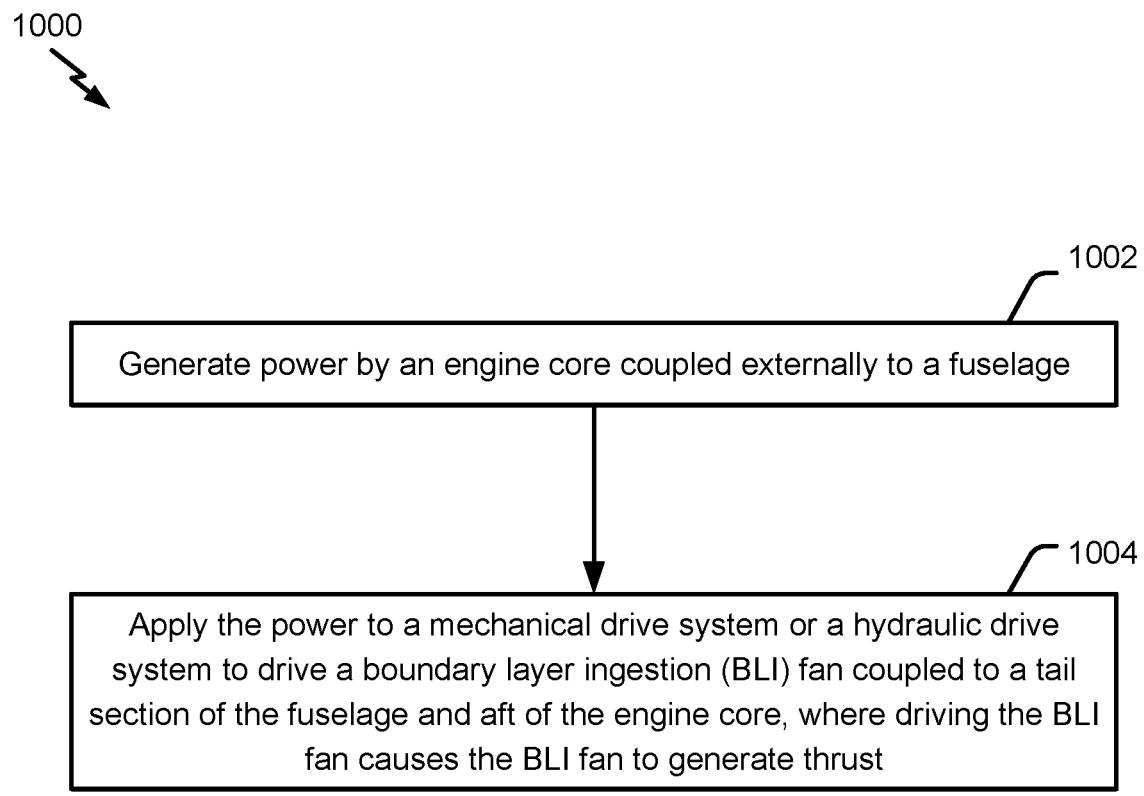
FIG. 10 is a flow chart of an example of a method of driving a BLI fan.

FIG. 10 is a flowchart of a method 1000 of operating a propulsion system. The propulsion system may include or correspond to the propulsion system 101 of FIG. 1. The method 1000 may be performed by the propulsion system 101, the first engine core 112, the second engine core 122, the BLI fan drive system 108, the shaft 142, the BLI fan 110, or a combination thereof. The method 1000 includes, at 1002, generating power by an engine core coupled externally to a fuselage. For example, the first engine core 112 is coupled via the pylon 212 to the fuselage 202 of the aircraft 201 and generates power to rotate a shaft, as described with reference to FIGS. 2-7. The shaft may include or correspond to the shaft 142 of FIG. 1, the first shaft 302, or the second shaft 304 of FIG. 3. In some implementations, the first engine core 112 is coupled to the fuselage 202 aft of the wings 204 and fore of the tail section 216 (e.g., the vertical stabilizer 308). In other implementations, the first engine core 112 is coupled to one of the wings 204 or to the tail 206 (e.g., the vertical stabilizer 308).

In some implementations, the method 1000 includes receiving, by an inlet of the engine core, free stream air and compressing, by a compressor of the engine core, the free stream air. The method 1000 further includes combusting, by a combustor of the engine core, the compressed free stream air and fuel to rotate a turbine of the engine core to generate the power.

The method 1000 of FIG. 10 further includes, at 1004, applying the power to a mechanical driveshaft system or a hydraulic drive system to drive a boundary layer ingestion (BLI) fan coupled to a tail section of the fuselage and aft of the engine core, where driving the BLI fan causes the BLI fan to generate thrust. For example, the first engine core 112 applies the power to the BLI fan drive system 108 which transmits or transfers the power to the BLI fan 110, as described above with reference to FIGS. 1, 3, and 6. The BLI fan drive system 108 may include a mechanical driveshaft system, as described with reference to FIG. 3, or a hydraulic drive system, as described with reference to FIG. 7. In some implementations, the BLI fan 110 is coupled to the tail section 216 aft of the vertical stabilizer 308. Additionally or alternatively, a circumference of the BLI fan 110 (e.g., an inlet of the BLI fan 110) is greater than a circumference of the tail section 216 of the fuselage 202 preceding the BLI fan 110.

In some implementations, the method 1000 further includes generating, by a second engine core, second power to drive a second fan. For example, the second engine core 122 is coupled externally to the fuselage 202 of the aircraft 201 and generates power to rotate the second fan 124, as described with reference to FIGS. 2-8. Coupled externally refers to being coupled to the fuselage 202 via a pylon (e.g., the pylon 214 or via a pylon or a nacelle of the BLI fan 110), being coupled to the tail 206, being integrated within the vertical stabilizer 308, or being coupled to one of the wings 204. In a particular implementation, the second engine core is further coupled to the BLI fan and configured to provide a portion of the second power to the BLI fan.

In some implementations, the second engine core is further coupled to the BLI fan via the mechanical driveshaft system or the hydraulic drive system. In a particular implementation, the engine core is coupled to the BLI fan via a first shaft of the mechanical driveshaft system, and the second engine core is coupled to the BLI fan via a second shaft of the mechanical driveshaft system. In another particular implementation, the engine core and the second engine core are coupled to the BLI fan via a first shaft of the mechanical driveshaft system, as described with reference to FIG. 3. In other implementations, the engine core and the second engine core are coupled to the hydraulic drive system 701, as described with reference to FIG. 7.

In some implementations, the method 1000 further includes generating, by a third engine core, third power to drive a third fan. For example, the third engine core 132 is coupled externally to the fuselage 202 of the aircraft 201 and generates power to rotate the third fan 114, as described with reference to FIG. 8.

In some implementations, the method 1000 further includes applying the power to the fourth fan to drive the fourth fan and generate thrust. The fourth fan is collocated with the engine core and coupled to the engine core.

Figure 11:
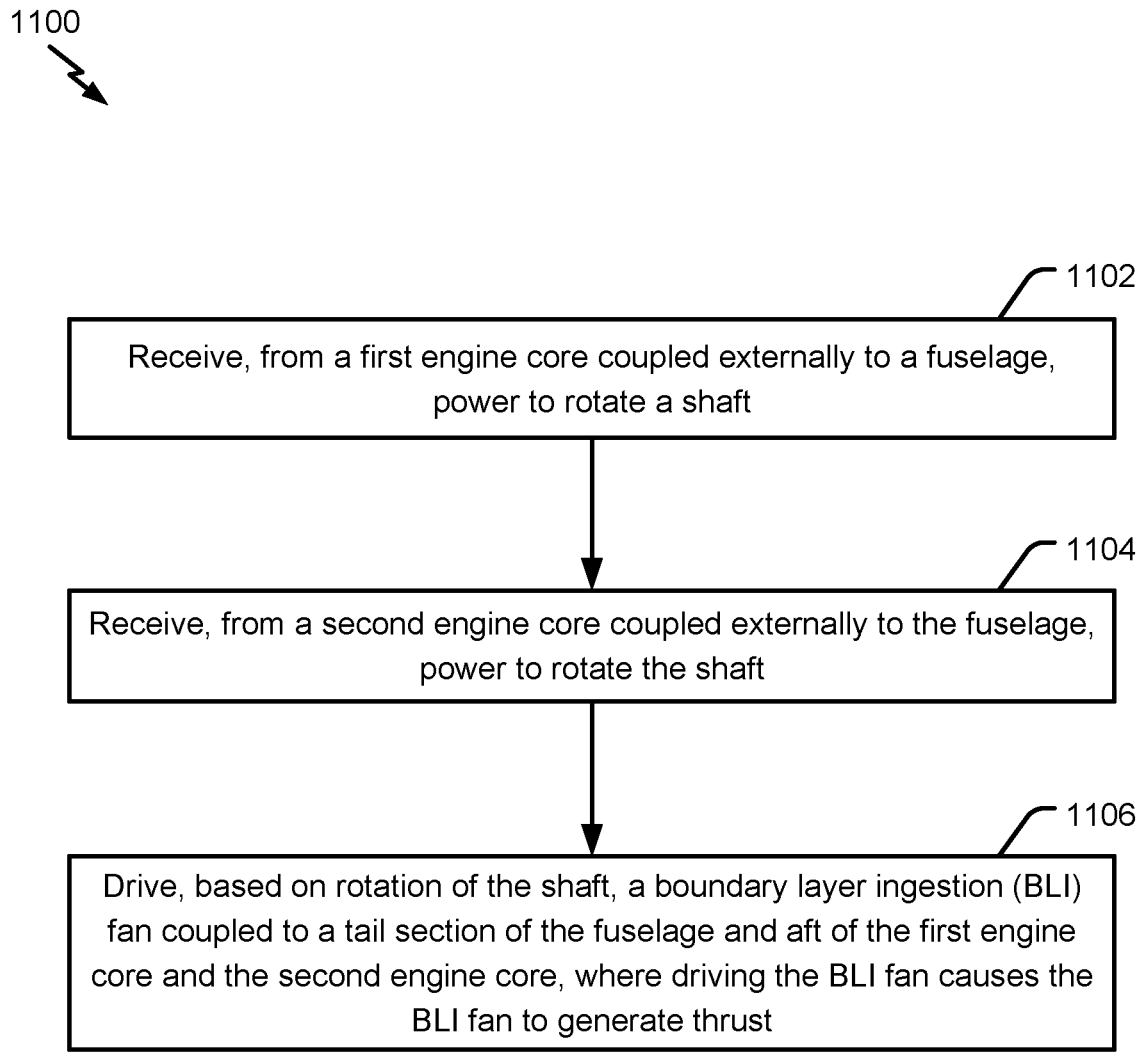
FIG. 11 is a flow chart of an example of a method of providing power to a BLI fan.

FIG. 11 illustrates a second example of a method 1100 of operating a BLI propulsion system, such as the propulsion system 101 of FIG. 1. The method 1100 illustrates operations that may be performed by the propulsion system 101, the BLI fan drive system 108, the shaft 142 of FIG. 1, or a combination thereof. The method 1100 includes, at 1102, receiving, from a first engine core coupled externally to a fuselage, power to rotate a shaft. For example, the first engine core may include or correspond to one of the engine cores 112, 122, or 132 of FIGS. 1-9. The first engine core coupled externally to the fuselage may include an engine core coupled to the fuselage via an external pylon, coupled to the tail (as described with reference to FIG. 8), or coupled to a wing (as described with reference to FIG. 4). The shaft may include or correspond to the shaft 142 of FIG. 1, the first shaft 302, or the second shaft 304 of FIG. 3.

The method 1100 includes, at 1104, receiving, from a second engine core coupled externally to the fuselage, power to rotate the shaft. For example, the second engine core may include or correspond to another one of the engine cores 112, 122, or 132 of FIGS. 1-9. The method 1100 includes, at 1106, driving, based on rotation of the shaft, a boundary layer ingestion (BLI) fan coupled to a tail section of the fuselage and aft of the first engine core and the second engine core. Driving the BLI fan causes the BLI fan to generate thrust. For example, the BLI fan may include or correspond to the BLI fan 110 of FIGS. 1-9.

In some implementations, the BLI fan includes an inlet configured to receive air from a boundary layer of the fuselage. The boundary layer air has a first speed less than a second speed of free stream air received by the engine core. In a particular implementation, the BLI fan is coupled to the fuselage aft of tail of the aircraft. In some implementations, the inlet of the BLI fan has a first circumference greater than a second circumference of an exterior of the tail section of the fuselage, as described with reference to FIG. 2. In a particular implementation, the tail section of the fuselage is tapered, as described with reference to FIG. 2.

In some implementations, the aircraft corresponds to a two-engine aircraft (e.g., the aircraft consists of two engine cores and is classified as a two-engine aircraft). In such implementations, the two-engine aircraft may include other gas turbine engines, such as an auxiliary power unit (APU) configured to generate electricity. In some implementations, the two-engine aircraft consists of two propulsors or fans (e.g., the BLI fan 110 and the second fan 124) used to generate thrust. The two propulsors or fans are distinct from compressor blades and turbine blades of the engine cores. In other implementations, the two-engine aircraft consists of three propulsors or fans (e.g., the BLI fan 110, the second fan 124, and the third fan 114). In such implementations, one or more of the fans 110, 114, and 124 may include multistage fans, such as a contra rotating fan. For example, a multistage fan may include two contra rotating sets of fan blades. Because aircraft typically have superior economics and performance with two engines, two-engine aircraft have decreased operational costs as compared to conceptual designs that include more than two engines/engine cores.

In other implementations, the aircraft corresponds to a three-engine aircraft (e.g., the aircraft consists of three engine cores and is classified as a three-engine aircraft). In such implementations, the three-engine aircraft may have other gas turbine engines, such as an auxiliary power unit (APU) configured to generate electricity. In some implementations, the three-engine aircraft consists of three propulsors or fans (e.g., the BLI fan 110, the second fan 124, and the third fan 114) used to generate thrust and distinct from compressor blades and turbine blades of the engine cores. In other implementations, the three-engine aircraft consists of four propulsors or fans (e.g., the BLI fan 110, the second fan 124, the third fan 114, and the fourth fan 134). In such implementations, one or more of the fans 110, 114, 124, and 134 may include multistage fans, such as a contra rotating fan. Alternatively, the aircraft may include more than three engine cores, more than four fans, or both.

Figure 12:
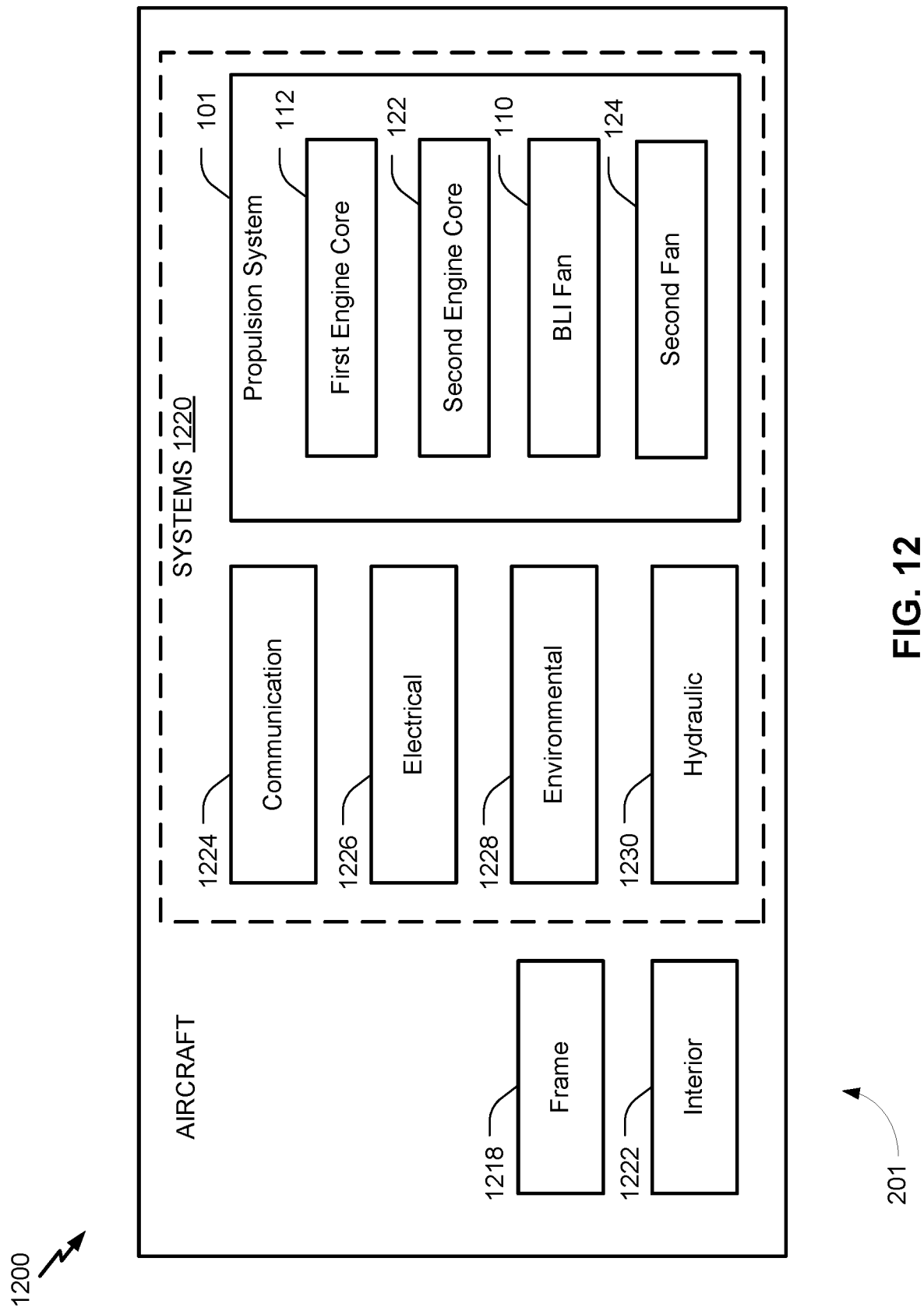
FIG. 12 is a block diagram of an example of an aircraft including a BLI propulsion system.

Referring to FIG. 12, a block diagram of an illustrative implementation of the aircraft 201 that includes the propulsion system 101 is shown and designated 1200. As shown in FIG. 12, the aircraft 201 includes an airframe 2018, an interior 1222, and a plurality of systems 1220. The plurality of systems 1220 includes the propulsion system 101, a communication system 1224, an electrical system 1226, a hydraulic system 1230, and an environmental system 1228. Any number of other systems may be included. The propulsion system 101 includes at least the first engine core 112, the second engine core 122, the BLI fan 110, and the second fan 124 of FIG. 1. The propulsion system 101 may further include a controller configured to execute computer-executable instructions (e.g., a program of one or more instructions) stored in a memory. The instructions, when executed, cause the controller, to perform one or more operations of the method 1000 of FIG. 10, the method 1100 of FIG. 11, or a combination thereof. In a particular implementation, the controller includes a processor and the memory includes a non-transitory computer-readable medium. In some implementations, the propulsion system 101 includes one or more of the third fan 114, the third engine core 132, or the fourth fan 134 of FIG. 1.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An aircraft comprising:
   a fuselage having a tail section;
   a first engine core without a third fan collocated with the first engine core to provide thrust to the aircraft, the first engine core coupled to the fuselage via an external pylon;
   a boundary layer ingestion (BLI) fan coupled to the tail section of the fuselage and coupled to the first engine core via a shaft, wherein the shaft provides power that rotates the BLI fan;
   a second engine core coupled to the fuselage, the second engine core including a second fan collocated with the second engine core to provide thrust to the aircraft; and
   a propulsion system configured to adjust a thrust ratio between the BLI fan and one or more fans, wherein the one or more fans include the second fan, wherein the thrust ratio has a first value during a take-off portion of a flight, and wherein the thrust ratio is increased to a second value for a cruise portion of the flight.

2. The aircraft of claim 1, wherein the BLI fan is configured to provide thrust to the aircraft based on rotation of the shaft.

3. The aircraft of claim 1, wherein the second engine core is coupled to a BLI fan drive system to provide power to the BLI fan.

4. The aircraft of claim 1, wherein the first engine core corresponds to a turboshaft engine, and wherein the second engine core corresponds to a turbofan engine, a propfan engine, or a turboprop engine.

5. The aircraft of claim 1, further comprising a third engine core coupled to the fuselage, the third engine core including a fourth fan collocated with the third engine core to provide thrust to the aircraft.

6. The aircraft of claim 1, further comprising a transmission configured to transfer power from the first engine core and the second engine core to the BLI fan, wherein the shaft and the transmission are included in a BLI fan drive system.

7. The aircraft of claim 1, further comprising a second shaft coupled to the shaft via a gear system, the shaft coupled to the BLI fan and configured to receive power from the second shaft to rotate the BLI fan.

8. The aircraft of claim 1, wherein the BLI fan includes an inlet configured to receive air from a boundary layer of the fuselage, and wherein the air from the boundary layer has a first speed that is less than a second speed of free stream air received by the first engine core.

9. The aircraft of claim 1, further comprising a hydraulic drive system coupled to the shaft and to the BLI fan, the hydraulic drive system configured to transmit power from the shaft to the BLI fan.

10. The aircraft of claim 1, further comprising at least one wing coupled to the fuselage, wherein the first engine core is coupled to the fuselage aft of the at least one wing.

11. An aircraft comprising:
    a fuselage having a tail section;
    a first engine core without a third fan collocated with the first engine core to provide thrust to the aircraft, the first engine core coupled to the fuselage via an external pylon;
    a pair of wings coupled to the fuselage;
    a second engine core coupled to a first wing of the wings, the second engine core including a second fan collocated with the second engine core to provide thrust to the aircraft;
    a boundary layer ingestion (BLI) fan coupled to the tail section of the fuselage and coupled via a mechanical driveshaft system or a hydraulic drive system to the first engine core; and
    a propulsion system configured to adjust a thrust ratio between the BLI fan and one or more fans, wherein the one or more fans include the second fan, wherein the thrust ratio has a first value during a take-off portion of a flight, and wherein the thrust ratio is increased to a second value for a cruise portion of the flight.

12. The aircraft of claim 11, wherein the second engine core is positioned below the first wing.

13. The aircraft of claim 11, wherein the second engine core is positioned above the first wing.

14. The aircraft of claim 11, wherein the first engine core is coupled to the BLI fan via a first shaft of the mechanical driveshaft system.

15. The aircraft of claim 11, wherein an auxiliary drive shaft coupled to the first engine core is coupled to drives a hydraulic pump of the hydraulic drive system.

16. An aircraft comprising:
    a fuselage having a tail section;
    a tail coupled to the tail section of the fuselage;
    a first engine core coupled to the tail, the first engine core without a fan collocated with the first engine core to provide thrust to the aircraft;
    a second engine core coupled to the fuselage, the second engine core including a second fan collocated with the second engine core to provide thrust to the aircraft;
    a boundary layer ingestion (BLI) fan coupled to the tail section of the fuselage and coupled to the first engine core by a shaft; and
    a propulsion system configured to adjust a thrust ratio between the BLI fan and one or more fans, wherein the one or more fans include the second fan, wherein the thrust ratio has a first value during a take-off portion of a flight, and wherein the thrust ratio is increased to a second value for a cruise portion of the flight.

17. The aircraft of claim 16, wherein the second engine core is coupled to the tail section.

18. The aircraft of claim 16, further comprising a third engine core coupled externally to the fuselage and configured to drive a fourth fan collocated with the third engine core to provide thrust to the aircraft.

19. The aircraft of claim 18, wherein the second engine core is coupled to a BLI fan drive system to provide power to the BLI fan.

20. A method comprising:
generating power by a first engine core coupled by an external pylon to a fuselage of an aircraft, the first engine core without a third fan collocated with the first engine core to provide thrust to the aircraft;
generating thrust for the aircraft via a second fan of a second engine core coupled to the fuselage, wherein the first engine core and the second engine core are asymmetrically positioned relative to a longitudinal centerline of the fuselage;
applying the power via a shaft to a mechanical driveshaft system or a hydraulic drive system to drive a boundary layer ingestion (BLI) fan coupled to a tail section of the fuselage and aft of the first engine core, wherein driving the BLI fan causes the BLI fan to provide thrust to the aircraft; and
adjusting a thrust ratio between the BLI fan and one or more fans, wherein the one or more fans include the second fan, wherein the thrust ratio has a first value during a take-off portion of a flight, and wherein the thrust ratio is increased to a second value for a cruise portion of the flight.

21. The method of claim 20, further comprising:
receiving, by an inlet of the first engine core, free stream air;
compressing, by a compressor of the first engine core, the free stream air to compressed free stream air; and
combusting, by a combustor of the first engine core, the compressed free stream air and fuel to rotate a turbine of the first engine core to generate the power.

* * * * *